Dec. 30, 1941.  F. R. BELLUCHE  2,267,784
SHEET FEEDER
Filed Oct. 30, 1939  20 Sheets-Sheet 2

Inventor
Frank R. Belluche
By Milton Jones
Attorney

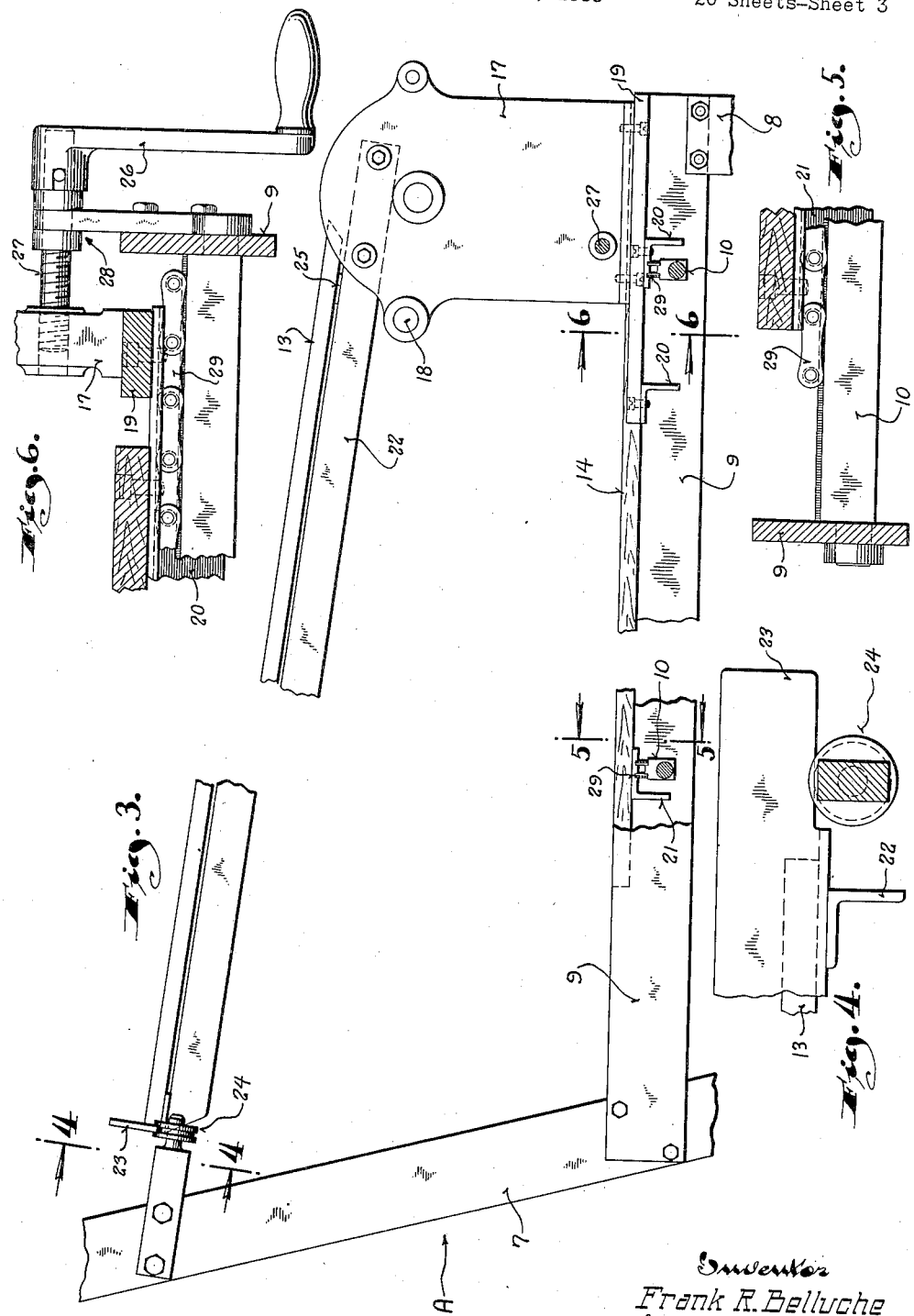

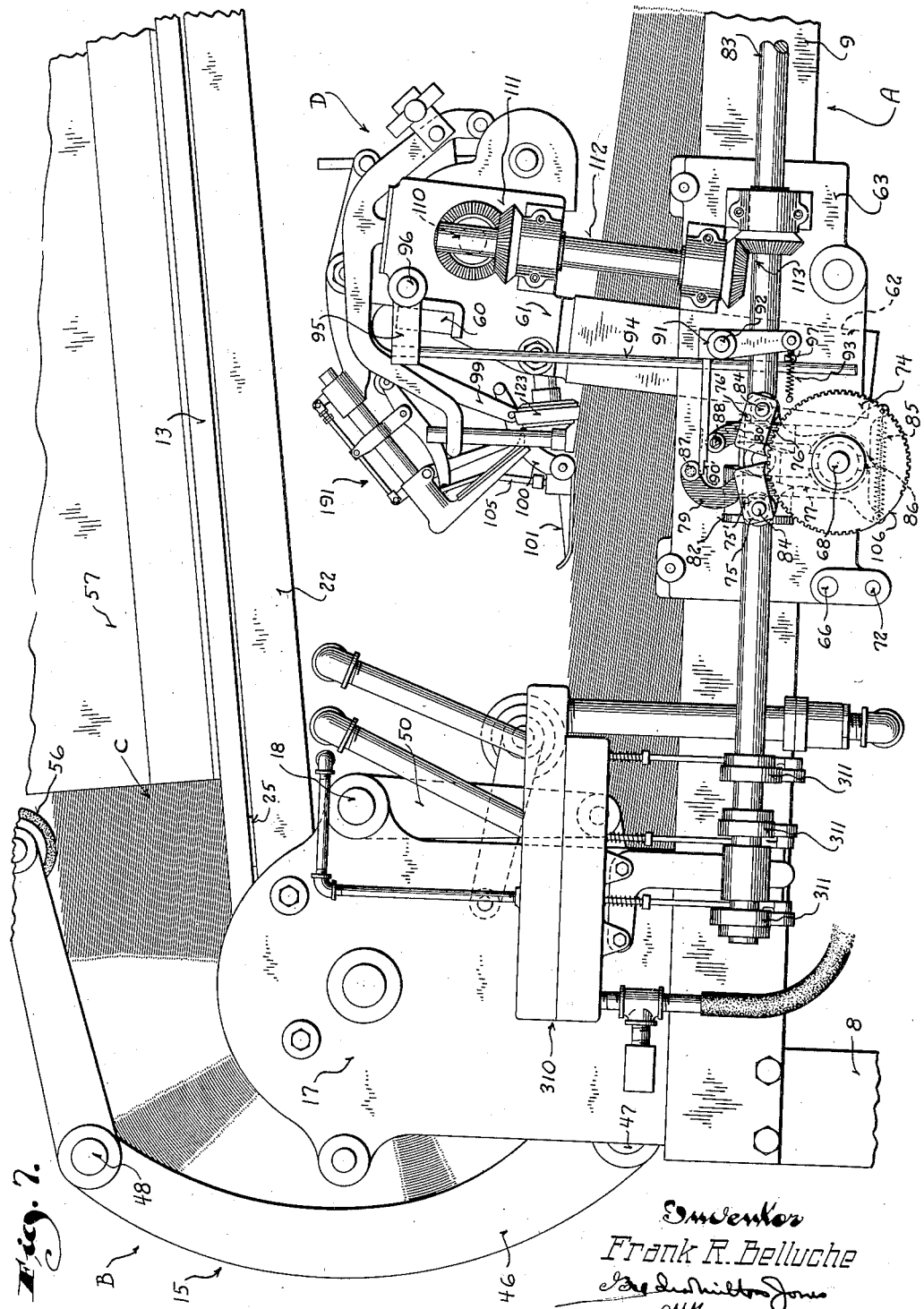

Dec. 30, 1941.　　　F. R. BELLUCHE　　　2,267,784
SHEET FEEDER
Filed Oct. 30, 1939　　　20 Sheets-Sheet 5

Inventor
Frank R. Belluche
By Dwitton Jones
Attorney

Dec. 30, 1941.  F. R. BELLUCHE  2,267,784
SHEET FEEDER
Filed Oct. 30, 1939  20 Sheets-Sheet 6

Inventor
Frank R. Belluche
By Hamilton Jones
Attorney

Dec. 30, 1941.  F. R. BELLUCHE  2,267,784
SHEET FEEDER
Filed Oct. 30, 1939  20 Sheets-Sheet 7
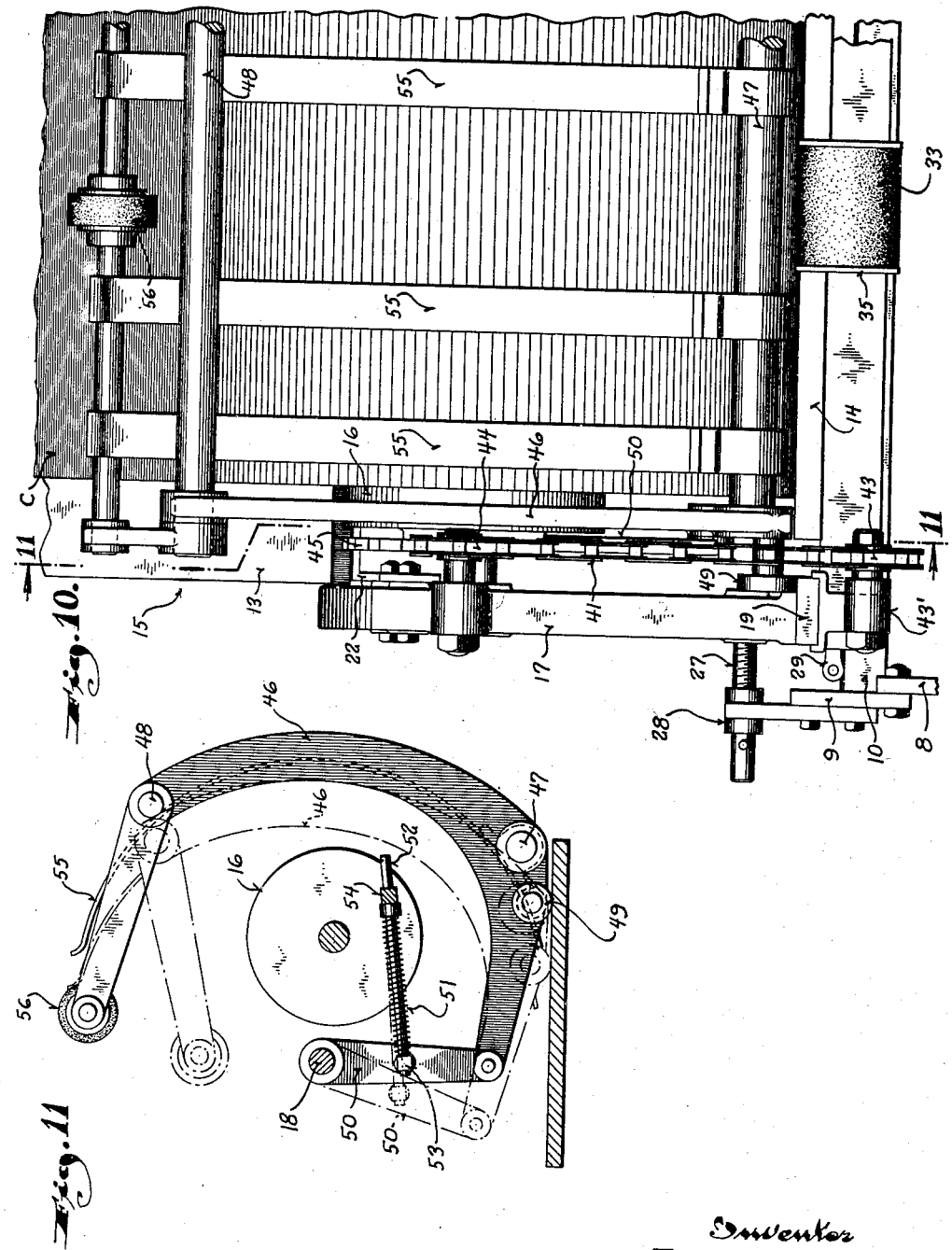
Inventor
Frank R. Belluche
By Hamilton Jones
Attorney Dec. 30, 1941.　　　F. R. BELLUCHE　　　2,267,784
SHEET FEEDER
Filed Oct. 30, 1939　　　20 Sheets-Sheet 8

Inventor
Frank R. Belluche
By [signature]
Attorney

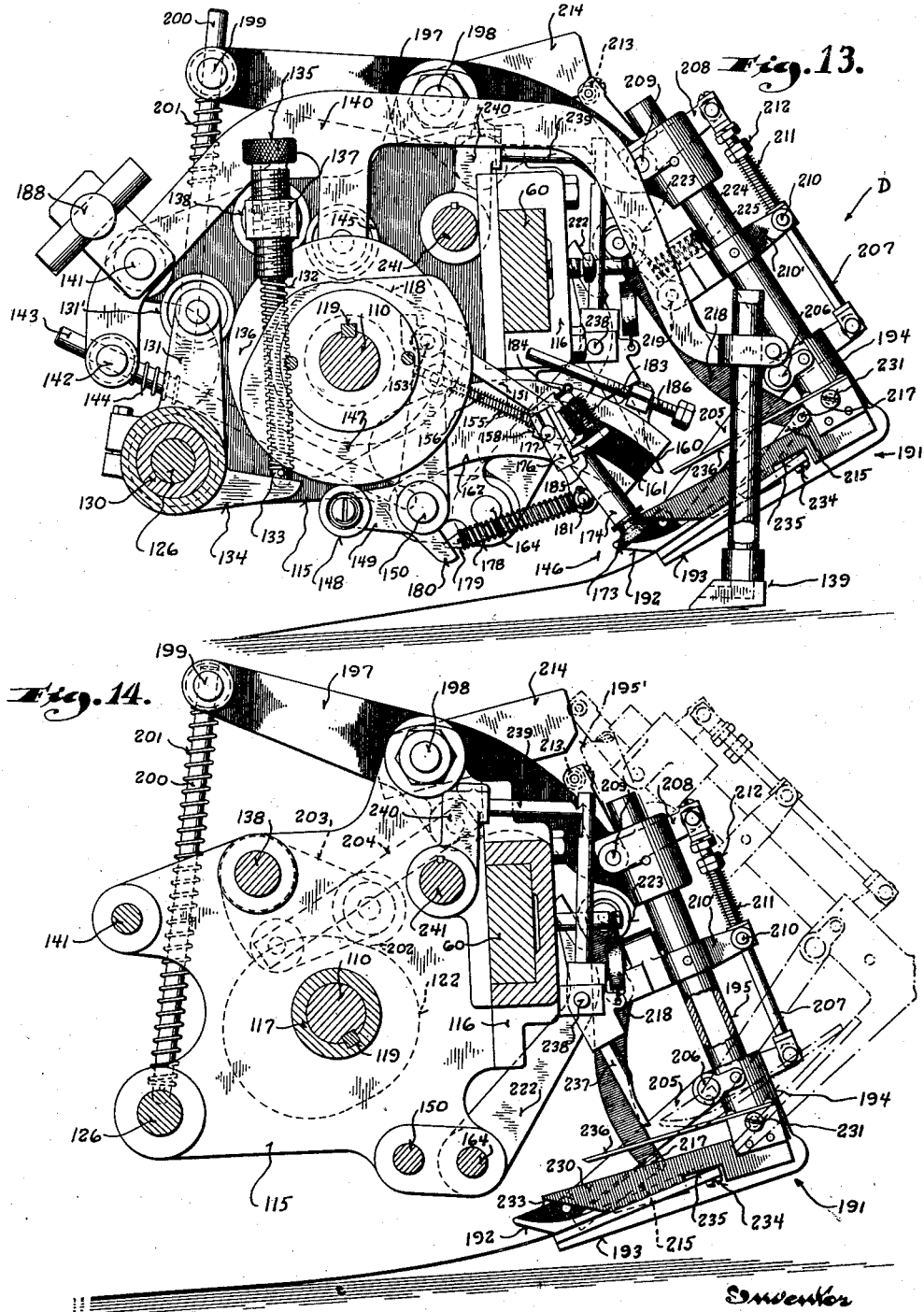

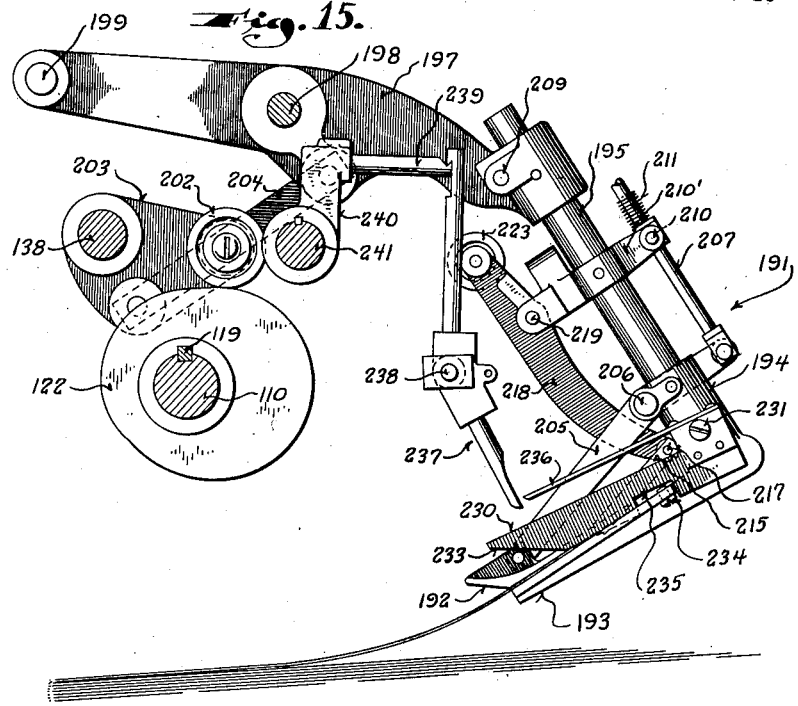
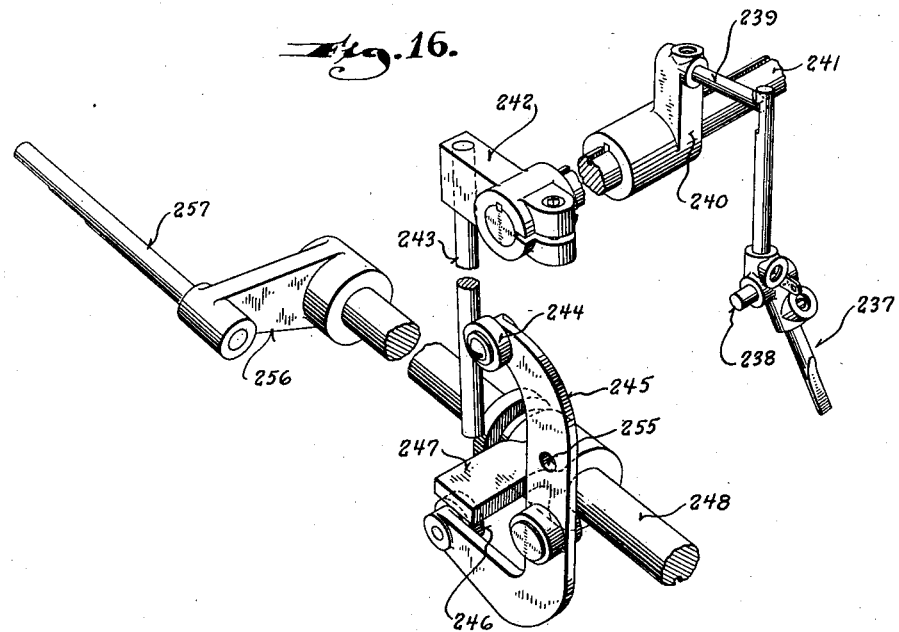

Dec. 30, 1941.　　　　F. R. BELLUCHE　　　2,267,784
SHEET FEEDER
Filed Oct. 30, 1939　　　20 Sheets-Sheet 11
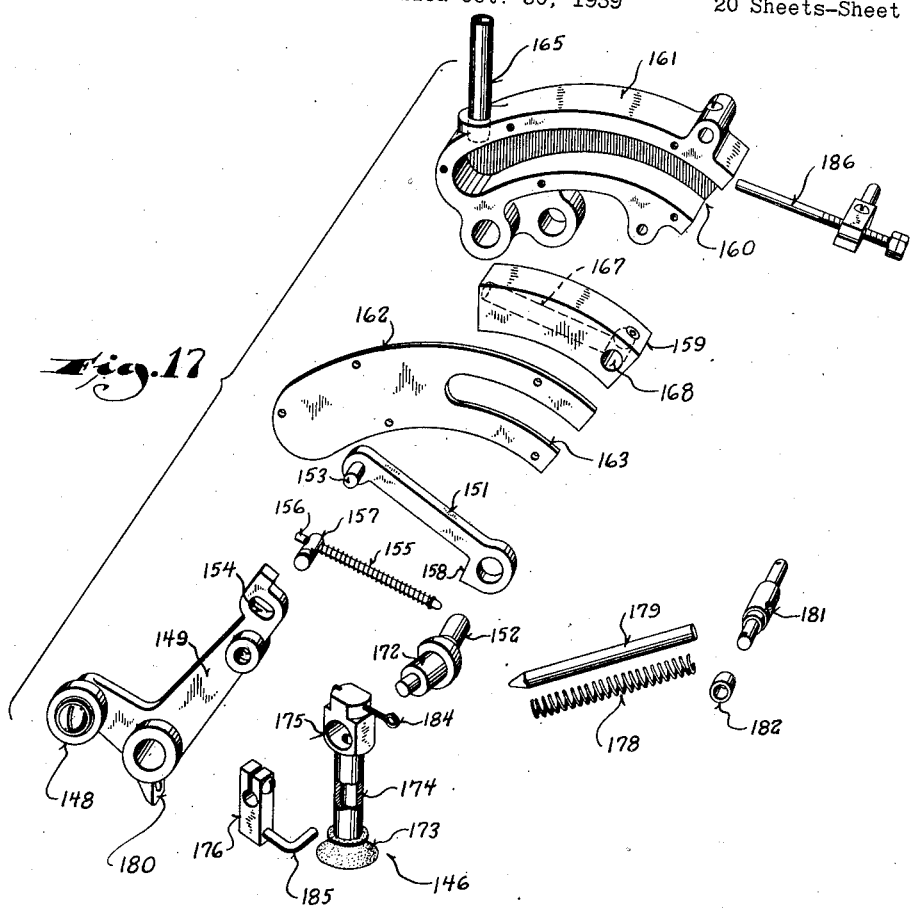
Fig. 17.
Fig. 18.
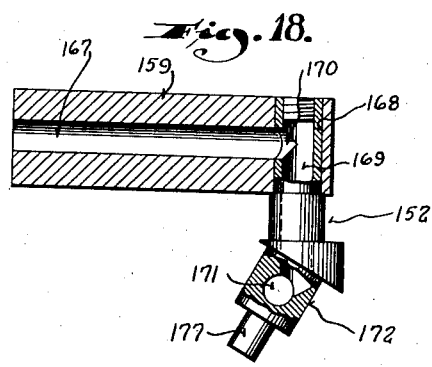
Inventor
Frank R. Belluche
By Milton Jones
Attorney Dec. 30, 1941.　　　F. R. BELLUCHE　　　2,267,784
SHEET FEEDER
Filed Oct. 30, 1939　　　20 Sheets-Sheet 13

Inventor
Frank R. Belluche
By his Milton Jones
Attorney

Dec. 30, 1941.  F. R. BELLUCHE  2,267,784
SHEET FEEDER
Filed Oct. 30, 1939  20 Sheets-Sheet 14
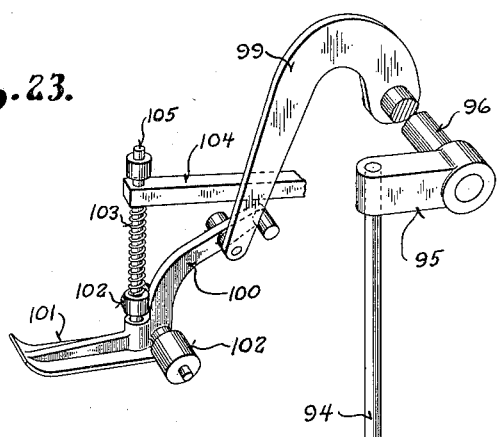
Fig. 23.
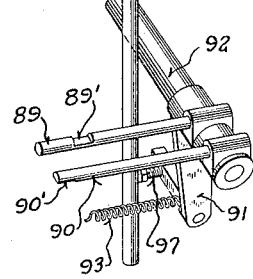
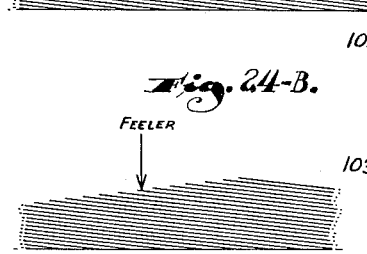
Fig. 24-A.
FEELER
Fig. 24-B.
FEELER
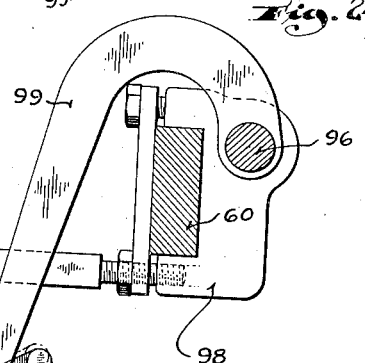
Fig. 24.
TRAILING EDGES OF SHEETS
WHEN BANK RUNS OUT
Inventor
Frank R. Belluche
By [signature]
Attorney

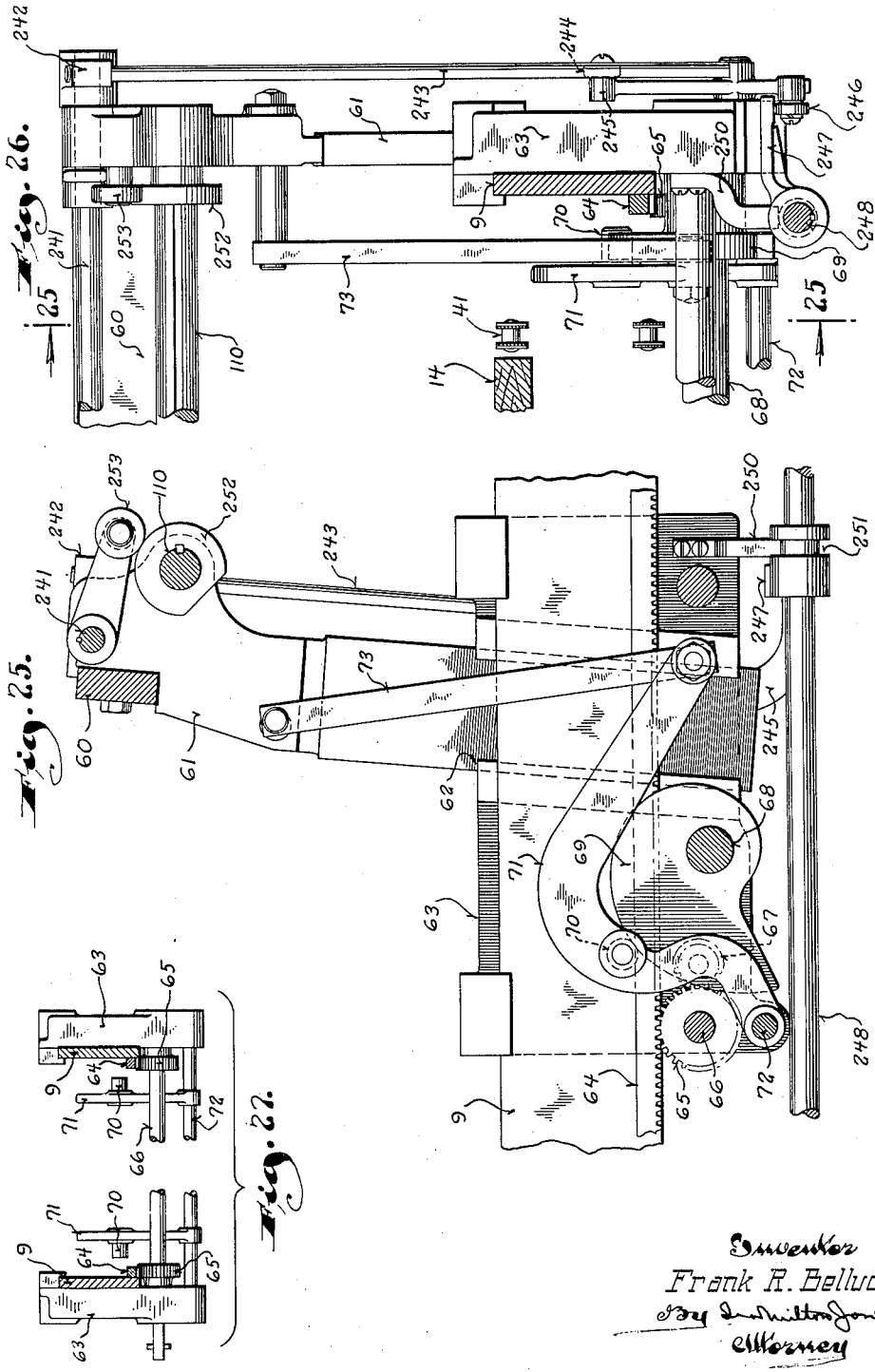

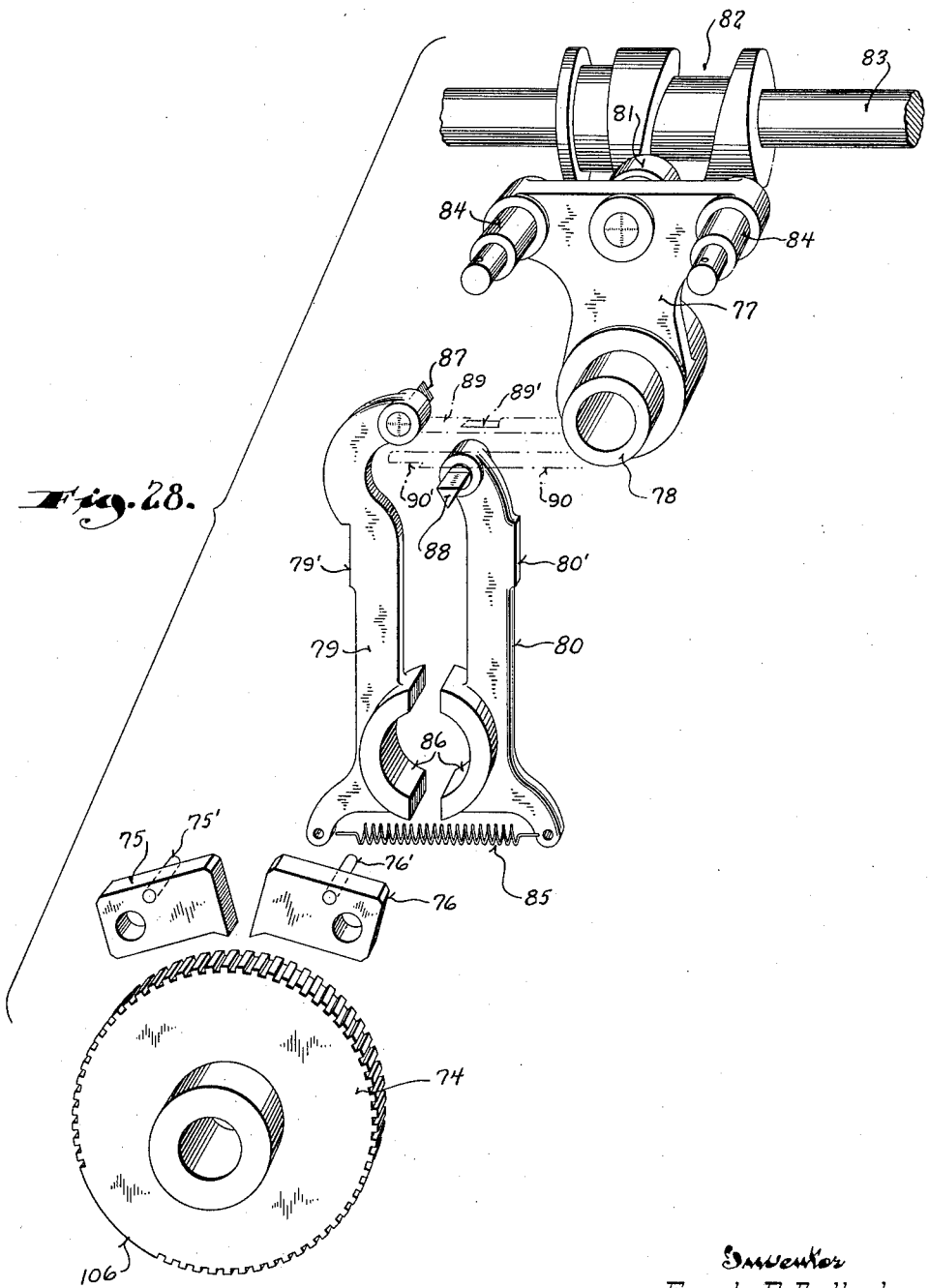

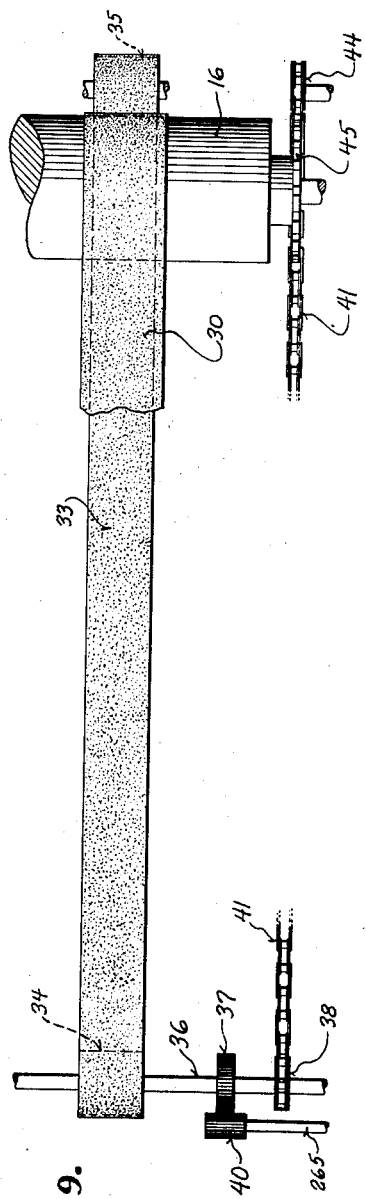
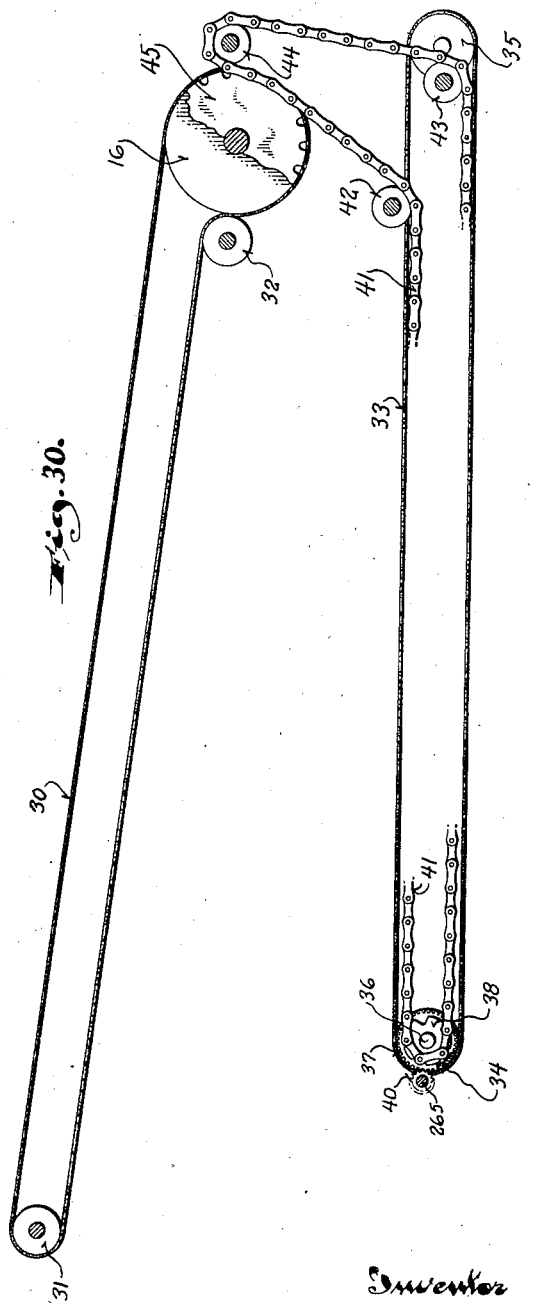

Dec. 30, 1941.  F. R. BELLUCHE  2,267,784
SHEET FEEDER
Filed Oct. 30, 1939   20 Sheets-Sheet 18
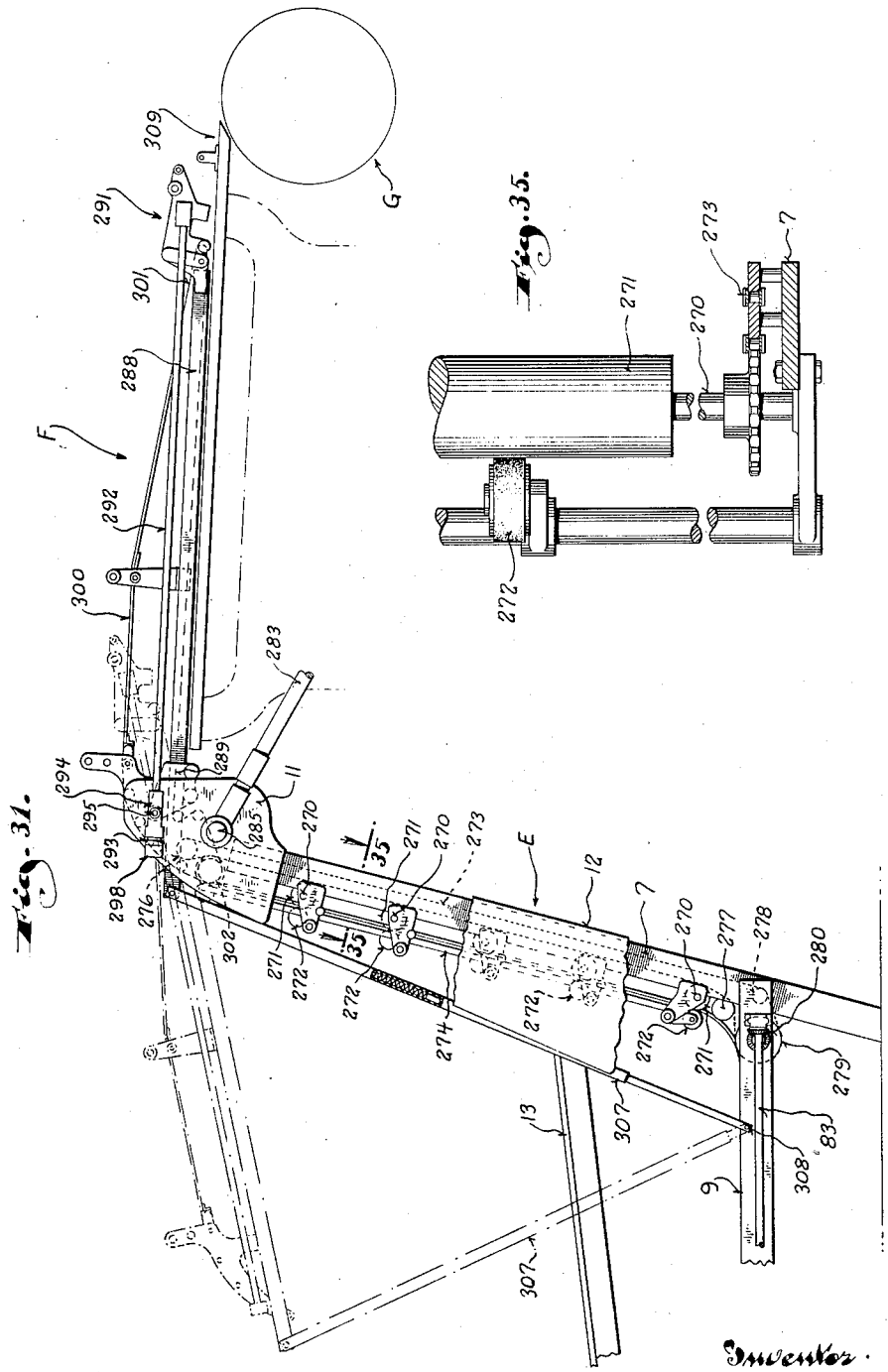
Inventor.
Frank R. Belluche
By
Attorney

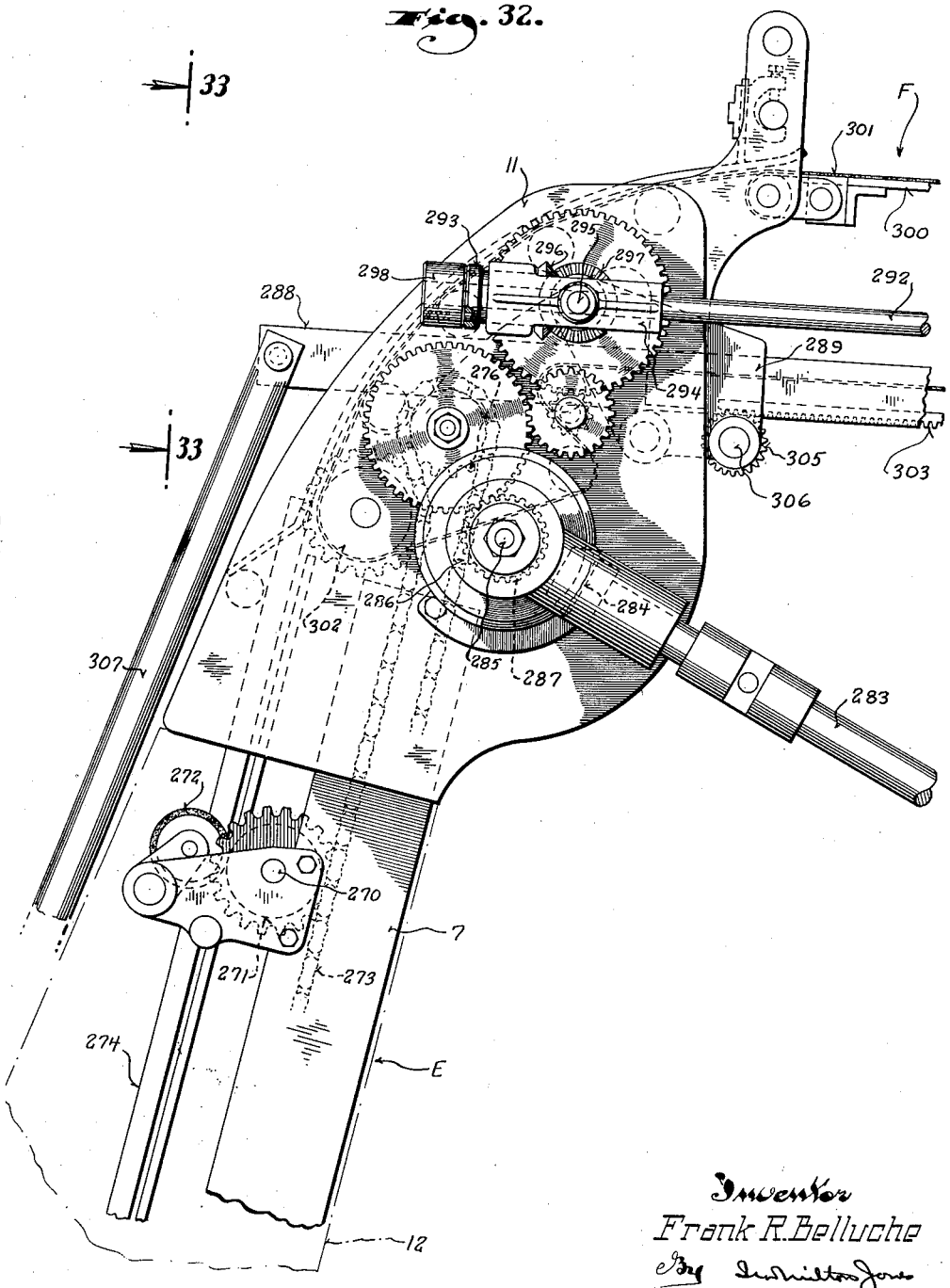

Dec. 30, 1941.　　　F. R. BELLUCHE　　　2,267,784
SHEET FEEDER
Filed Oct. 30, 1939　　　20 Sheets-Sheet 20

Inventor
Frank R. Belluche

UNITED STATES PATENT OFFICE 2,267,784

SHEET FEEDER

Frank R. Belluche, Racine, Wis.

Application October 30, 1939, Serial No. 302,025

74 Claims. (Cl. 271—38)

This invention relates to sheet feeders, and has as a general object to provide an improved feeder of the continuous type designed for feeding sheets in a seriated stream.

Where sheets are to be fed in this manner, the separating and forwarding mechanism must act on the rear edge portions of the sheets; and inasmuch as the thickness of the bank of sheets presented to the separating and forwarding mechanism varies, the maintenance of proper elevational relationship between the topmost sheet and the separating and forwarding mechanism entails adjustment of either the bank support or the separating and forwarding mechanism.

This invention meets this requirement through the provision of novel means for raising and lowering the separating and forwarding mechanism at the dictation of a control responsive to variations in the thickness of the bank at the rear edge of the topmost sheet.

Another object of this invention is to provide for a relatively thick bank of fanned out sheets, approximately five to eight inches, as distinguished from past practice wherein bank thicknesses of not more than two or three inches were employed.

A thick bank has the advantage of reducing the frequency with which the bank must be replenished, but because of its thickness, a substantial variation occurs in the extent of the overlap as the bank travels around the throat of the feeder. As a consequence, the speed of the bank advance on the lower feed board should be greater than that of the bank advance on the upper feed board if slippage between the bank and the tapes is to be avoided, and this invention has as a further object to provide simple means whereby this differential in bank advancing speed is achieved.

Another object of this invention resides in the provision of a novel feeler device, which although it contacts the top of the bank, a distance to the rear of the rear edge of the topmost sheet where the thickness of the bank decreases appreciably before it does at the rear edge of the topmost sheet as the bank runs out, the effect of the feeler on the control instrumentalities with which it is connected is at all times accurately coordinated with the height of the bank adjacent to the rear edge of the topmost sheet.

Proper coordination of the bank advancing means with the separating and forwarding mechanism is another prerequisite to successful operation of a feeder of the character described. To this end, the present invention has as one of its objects to provide means for accurately controlling the bank advancing means from the rear edge of the sheet being acted upon by the separating and feed off mechanism.

In the interest of accuracy and speed of operation, the present invention also has as an object to provide means for squaring the sheet during its advance off the bank by the separating and forwarding mechanism.

Also in the interest of speed of operation, it is an object of this invention to provide means for winding the sheets from the rear edges thereof, which means is so arranged as to travel forwardly with the sheet so as to direct the blast of air properly under the sheet at all times.

More specifically it is an object of this invention to provide separating and forwarding mechanism by which the sheets are successively advanced off the bank, and which includes grippers having complementary upper and lower jaws to engage over the rear edge portion of the sheet, and wherein the lower jaw constitutes an air discharge nozzle for directing a blast of air under the sheet throughout the entire sheet advancing motion.

Inasmuch as feeders of this character are designed to handle a wide variety of types of paper, ranging from very thin stock to semi-cardboard, the thickness of the bank varies even though in each instance it is piled to the maximum depth consistent with good practice and to accommodate this varying bank thickness, the present invention has as another object to provide automatically adjustable rigid guides at the throat of the feeder where the bank reverses itself.

Another object of this invention is to provide a compact separating and forwarding mechanism, and a novel manner of mounting the same to enable adjustment thereof to sheets of different sizes.

Another object of this invention is to provide an improved sheet separating and forwarding mechanism wherein the sheets are picked off the top of the bank by pneumatic suckers and concomitantly stretched transversely.

Another object of this invention is to provide an improved sheet separating and forwarding mechanism wherein the pneumatic suckers which pick the sheet off the top of the bank not only stretch the sheet transversely as it is lifted, but also impart a rearward pull thereto to straighten the same without loss of time to insure more effective winding.

Another object of this invention is to provide means for adjustably mounting the separator and forwarding mechanism in a manner whereby the mechanism is maintained at the proper position with relation to the leading edge of the bank throughout its entire vertical range of adjustment, notwithstanding the exceptional bank thicknesses employed.

Another object of this invention resides in the provision of a novel power driven means for raising and lowering the supporting structure carrying the separating and forwarding mechanism, and for determining when said power driven means is to function, from variations in the thickness of the bank.

Another object of this invention resides in the provision of an improved manner of mounting the connected upper and lower feed boards of the feeder for lateral adjustment.

Another object of this invention is to provide an efficient conveyor built into the frame of the feeder for advancing the fed off sheets in seriated fashion from the bank to the press or other machine being fed.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 3 is a feed side view showing the framework of the supporting structure for the upper and lower feed boards;

Figure 4 is a detail sectional view taken through Figure 3 on the plane of the line 4—4;

Figure 5 is a detail sectional view taken through Figure 3 on the plane of the line 5—5;

Figure 6 is a detail sectional view taken through Figure 3 on the plane of the line 6—6;

Figure 7 is an enlarged gear side view illustrating the throat portion of the feeder;

Figure 10 is an end view of the feed side portion of the throat joining the upper and lower feed boards;

Figure 11 is a detail view taken on the plane of the line 11—11 in Figure 10;

Figure 13 is a view similar to Figure 12, but taken on a plane inwardly of the combing wheel, and illustrating the parts in the positions they assume at the moment the sheet is being taken by the grippers;

Figure 14 is a view similar to Figures 12 and 13, taken on a plane still farther inwardly from that of Figure 13, and showing the parts in the positions they occupy at the time the sheet is being straightened;

Figure 15 is a sectional view through the separating and forwarding mechanism viewed in the same direction as Figures 12, 13 and 14, but illustrating only the gripper and the control mechanism whereby improper positioning of the sheet effects operation of the bank advancing means;

Figure 16 is a perspective view of the bank advancing latch and the motion transmitting elements which convey the motion controlled by this latch to the drive for the bank advancing mechanism;

Figure 17 is a perspective view of the sucker assembly disassembled and with its parts arranged substantially in their order of assembly;

Figure 18 is a detail view of the sucker supporting stud and the piston which carries it;

Figure 23 is a perspective view of the feeler mechanism and the linkage for transmitting motion thereof to the pawl controlling latch by which variations in the height or the thickness of the bank are utilized to adjust the height of the separating and forwarding mechanisms;

Figure 24 is a detail side view of the feeler;

Figure 33:
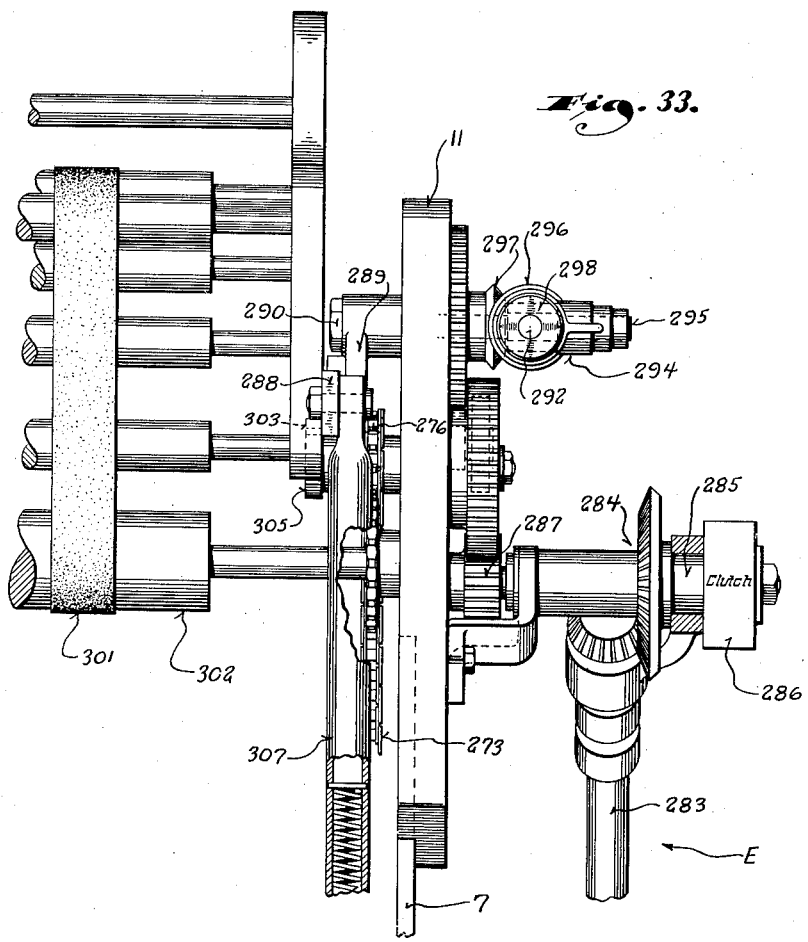
Figure 34:
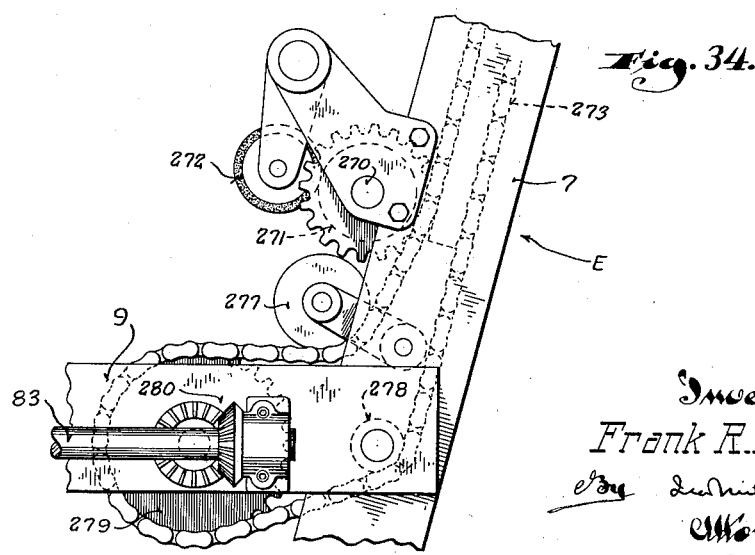

Figures 24—A and 24—B are diagrammatic views to show the manner in which the feeler corrects for descent of the point of feeler contact as the bank runs out;

Figure 25 is a detail view of the drive for raising and lowering the separating and forwarding mechanism, said view being taken on the plane of the line 25—25 in Figure 26, and looking out toward the feed side;

Figure 26 is a cross sectional view through the feed side frame of the feeder illustrating part of the mechanism for controlling the bank advance;

Figure 27 is a cross sectional view through the lower portion of the feeder on a small scale, to illustrate the manner in which both ends of the frame for the separating and forwarding mechanism are simultaneously moved forward and backward, and up and down;

Figure 28 is a perspective view of the elements constituting the actual drive for raising and lowering the separating and forwarding mechanism;

Figure 29 is a fragmentary top plan view of the tapes on the upper and lower feed boards, illustrating their relationship and the manner of driving the same;

Figure 30 is a more or less diagrammatic view illustrating the tapes of the upper and lower feed boards and the manner of effecting the desired driving relationship therebetween;

Figure 31 is a gear side view of the conveyor end of the feeder, to illustrate particularly the manner in which the top conveyor is racked back to uncover the feed board of the press;

Figure 32 is an enlarged gear side view of the upper end portion of the upright conveyor and the adjacent portion of the top conveyor;

Figure 33 is a detail view taken on the plane of the line 33—33 of Figure 32, and illustrating the rear end of the top conveyor and the adjacent portion of the upright conveyor;

Figure 34 is an enlarged gear side view of the lower portion of the upright conveyor to show the driving connection between the upright conveyor and the rest of the feeder; and Figure 35 is a detail sectional view taken through Figure 31 on the plane of the line 35—35.

Referring now particularly to the accompanying drawings in which like numerals indicate like parts throughout the several views, it will be seen that this invention comprises a main frame A arranged to rest on the floor and support a continuous type feeder unit B upon which the sheets C are loaded in a seriated bank to be separated and advanced in seriated or overlapped relation by separating and forwarding mechanism D, to be conveyed upwardly in such seriated or overlapped relation by an upright conveyor E to an upper horizontal conveyor F which feeds the sheets successively to a press or other machine, indicated in Figure 31 by the letter G.

FRAME A

*(Figures 1, 2, 3 and 31. Sheets 1, 2, 3 and 18)*

The frame A comprises longitudinal lower side rails 5 connected by tie rods 6, and front and rear uprights 7 and 8, respectively, extending up from the opposite ends thereof. The front uprights 7 are inclined and extend upwardly to support the conveyors E and F, while the rear uprights 8 extend only high enough to support the adjacent rear ends of upper side rails 9, the front ends of which are secured to the inclined uprights 7.

While in the present instance, the front uprights 7 are quite high so that the top conveyor F is at a substantial elevation, it is to be observed that the height of these uprights and the elevation of the conveyor F which is determined by the type of machine with which the feeder is associated, is not a material factor of the invention.

The upper side rails 9 are connected by transverse rails 10 substantially rectangular in cross section; and the upper ends of the front uprights 7 mount castings 11, which carry the bearings for the shafts and other mechanism mounted thereat, and by which the uprights 7 are connected. The sides of the uprights and the conveyor mechanism carried thereby are covered by guards 12 which extend from the castings 11 down to the floor. These guards, besides covering the mechanism at the sides of the upright conveyor, enhance the appearance of the entire structure.

FEEDER B

*(Figures 1, 2, 3, 4, 5, 6, 7, 10, 11, 29 and 30. Sheets 1, 2, 3, 4, 7 and 17)*

The feeder B is of the continuous type and comprises upper and lower feed boards 13 and 14, respectively, connected by a throat, indicated generally by the numeral 15.

As is customary, the paper which may range in weight from relatively thin stock to semi-cardboard, is loaded on the upper board which is inclined downwardly toward the throat, in a bank of substantial thickness.

Heretofore, in continuous type feeders, it has been customary to keep the bank thickness to three inches or less as difficulties were encountered whenever a thicker bank was employed. The present invention, through the provision of novel separating and forwarding mechanism, and through a novel manner of advancing the bank of sheets over the upper and lower feed boards, makes possible the use of a much thicker bank, which is obviously desirable as it reduces the frequency with which the bank must be replenished.

Attention is also directed to the fact that the upper feed board upon which the bank is loaded is at an elevation conveniently reached by workmen standing on the floor.

The throat 15 which connects the upper and lower feed boards comprises a drum 16 mounted between two pedestals 17. The pedestals are rigidly connected by a tie rod 18 and rest on base plates 19. These base plates are joined by transverse angle iron cross members 20, which together with a similar angle iron cross member 21, support the lower feed board 14.

The pedestals also have the adjacent ends of upper side rails 22 secured thereto, the forward ends of which are joined by an angle iron cross piece 23, whose vertical flange extends beyond the horizontal flange to rest on grooved rollers 24 supported from the adjacent uprights 7.

The upper feed board 13 is carried by the frame formed by the rails 22, the angle iron cross member 23, and two other cross members 25.

The entire feeder structure is freely adjustable transversely with respect to the frame A merely by the actuation of a crank 26 engageable with the extended end of a screw shaft 27 journalled, but endwise immovable in a bearing 28 carried by the feed side rail 9. To this end, the rearmost angle iron cross member 20 and the front angle iron cross member 21 have their horizontal flanges overlying the transverse rails 10 to be supported therefrom by anti-friction roller means conveniently provided by lengths of roller chain 29.

To hold the chains properly positioned with relation to the angle iron cross members 20 and 21 and the rails 10, the lower faces of the angle irons have grooves cut therein, while the top of the cross members 10 are rabbeted at their sides to receive the links of the chain.

The rollers 24 supporting the forward end of the upper feed board coact with the support for the lower feed board just described to permit the desired transverse adjustment of the feeder, and in view of the rigidity which characterizes the framework of the feeder, it is possible to shift the same transversely by the application of force applied at one end through the medium of the screw 27. This screw, as stated, is rotatable by a crank 26 and threads into a suitably tapped hole in the adjacent pedestal 17.

As is customary in continuous type feeders, the bank of paper while being supported by the upper and lower feed boards, actually rests on endless tapes which are moved intermittently to advance the bank over the upper feed board and around the throat onto and along the lower feed board.

As best shown in Figures 29 and 30, the tapes 30 for the upper feed board are trained about idler pulleys 31 at the front end of the board, around the drum 16, and over idler pulleys 32 adjacent to the drum, while the tapes 33 for the lower feed board are trained over pulleys 34 and 35 at the front and rear ends of the board, respectively.

Ordinarily, in continuous type feeders, the tapes on the upper feed board move at exactly the same rate of speed as the tapes on the lower feed board. This inherent characteristic of all continuous type feeders heretofore in use possibly accounts for the fact that thick banks were never used, for as the bank travels around the throat, it is fanned out more so that the distance between the adjacent front and rear edges of the sheets increases. An incident to this additional fanning out of the bank is a decrease in the thickness of the bank, which, however, is not important.

The difficulty encountered in past construction where the tapes on the upper and lower feed board moved at the same rate of speed was the inevitable slippage between the tapes and the bank, which was aggravated whenever the bank was loaded to more than the usual two and one-half or three inches.

The present invention overcomes this difficulty by providing a differential in the speed at which the tapes on the upper and lower feed boards travel. More particularly, the tapes 30 on the upper feed board travel at a slower rate of speed than the tapes 33 on the lower feed board. This, as will be readily apparent to those skilled in the art, compensates for the change in the extent of overlap which takes place as the sheets travel around the throat.

To so drive the tapes 30 and 33, the pulleys 34 at the front end of the lower board and about which the tapes 33 are trained, are secured to a transverse shaft 36 to which a gear 37 and a sprocket 38 are also fixed. The gear 37 has a pinion 40 meshing with it to drive the same and the sprocket 38 has a sprocket chain 41 trained thereover. The sprocket chain is endless and passes over idler pulleys 42, 43 and 44.

The idlers 42 and 44 are mounted on stub shafts anchored in the feed side pedestal 17, while the idler 43 is mounted on a stub shaft anchored in a bracket 43' suspended from the adjacent base plate 19. The arrangement of the idlers is such that one stretch of the chain is held in mesh with a sprocket wheel 45 on the shaft of the drum 16.

The desired speed differential results from the fact that the sprocket 38 has a pitch diameter smaller than the diameter of the pulleys 34 which drive the lower tapes 33. Hence, for a given angular travel of the gear 37, the tapes 33 travel farther than the chain 41, and as the upper tapes are driven by the chain 41, it follows that they too will travel a shorter distance than the tapes 33.

The exact ratio of this differential is of course dependent upon the extent to which the bank fans out beyond its initial condition as it travels around the drum 16. The manner in which the pinion 40 is driven constitutes part of the bank advancing mechanism which will be hereinafter described.

The mechanisms D for separating and forwarding the sheets are located between the upper and lower feed boards and act upon the rear edge portions of the sheets as they are presented thereto. This, of course, necessitates that the location of the bank on the lower feed board, and more particularly its topmost sheet, must be accurately maintained, which requires not only proper functioning of the bank advancing mechanism, but also security against shifting of the bank at the throat.

Heretofore, no particular means was employed to hold the bank against the drum as it traveled about the throat, for shifting of the bank at this point was not a serious matter. Consequently, flexible tapes or other means were relied upon to cause the bank to follow the drum.

The necessity for accuracy at this point in the present invention precludes the use of these past expedients, and in their stead, a novel rigid but adjustable support is provided for holding the bank against the drum. This support comprises a rigid frame consisting of two substantially arcuate castings 46 connected by tie rods 47 and 48. The rods 47 and 48 are at least as long as the drum 16 so that one casting 46 is located at each end of the drum.

This frame, consisting of the castings 46 and its tie rods, is supported by rollers 49 riding on the base plates 19, and is held against tilting about the axis of the rollers 49 by links 50 suspended from the tie rod 18 and connected at their lower free ends to the forwardly extending ends of the castings 46. Springs 51 yieldingly urge the frame toward the axis of the drum. These springs are mounted on guide rods 52 which have one end secured to the levers 50, as at 53, and their other ends slidably received in blocks 54 fixed to the inner faces of the pedestals 17.

The frame consisting of the castings 46 and their tie rods 47 and 48 carries a fence consisting of a plurality of curved bars 55 spaced at intervals along the length of the drum to contact the bank and hold it against the drum. The lower ends of these curved bars are attached to the lower tie rod 47, and their upper ends bear against the upper tie rod 48. This fence constitutes a rigid supporting structure for the bank at the throat capable of adjustment as required by variations in the bank thickness, but held by the strength of the springs 51 against such outward motion as would permit the bank to move away from the drum.

Idler rollers 56 are also preferably hung from the upper transverse tie rod 48 to rest by gravity on the top of the bank and guide the same into the throat.

The upper feed board preferably also has a side guide 57 mounted thereon against which the fanned out bank of sheets is loaded to locate the same in its proper sidewise position with respect to the separating and forwarding mechanism, but if adjustment is necessary, it may be effected by shifting the entire feeder transversely one way or the other by means of the crank 26 in the manner hereinbefore described.

SEPARATING AND FORWARDING MECHANISM D (Figures 1, 2, 7, 8, 9, 12, 13, 14, 15, 17, 18, 19, 20, 21, 22, 25, 26, 27 and 28. Sheets 1, 2, 4, 5, 6, 8, 9, 10, 11, 12, 13, 15 and 16)

As noted hereinbefore, the separating and forwarding mechanisms D are located in the space between the upper and lower feed boards to act on the rear edges of the topmost sheets of the bank as they are presented thereto.

Where the sheets to be handled are wide, as in the embodiment of the invention illustrated, at least two separating and forwarding mechanisms are employed, one near each side of the feeder, but if the sheets are relatively narrow, it is possible that a single separating and forwarding mechanism will suffice.

SUPPORTING STRUCTURE FOR SEPARATION AND FORWARDING MECHANISM (Figures 1, 2, 7, 8, 9, 25 and 26. Sheets 1, 2, 4, 5, 6 and 15)

Regardless of the number of separating and forwarding mechanisms used, they are adjustably mounted on a transverse supporting bar 60, the ends of which are secured to slides 61 guided for substantially vertical motion in guideways 62 formed in castings 63, which in turn are longitudinally slidable on the upper side rails 9 of the main frame structure.

The ability of the castings 63 to slide along the rails 9 enables the separating and forwarding mechanisms to be adjusted longitudinally to accommodate sheets of different lengths. To simultaneously slide the two castings 63 forwardly or backwardly, each rail 9 carries a rack 64 on its inner face facing downwardly, and pinions 65 fixed to a cross shaft 66 journalled in the castings 63, mesh therewith.

Rotation may be imparted to the shaft 66 carrying the gears 65 by means of a pinion 67 fixed to a short shaft journalled in the feed side casting 63. The outer end of this short shaft is provided with means for the attachment of a crank (not shown).

Variations in the width of the sheets are accommodated by sliding the mechanisms along the transverse supporting bar 60.

In the early continuous type feeders, the separating mechanism rested directly on the top of the bank, and in that manner was maintained in operative relation to the topmost sheets. Such constructions, however, cannot be used where the sheets are to be fed off the bank by means engaging their rear edges. In these cases, proper elevational relationship between the separating and forwarding mechanism and the height of the top sheet of the bank must be accurately maintained.

In the past, this has been accomplished by bodily raising and lowering the entire feed board with the bank thereon as adjustment was necessitated. This arrangement is illustrated in Patent No. 2,138,995 issued to Frank R. Belluche, December 6, 1938.

The objections of bodily raising and lowering the entire feed board and stack of paper thereon are at once apparent. The present invention overcomes these objections by adjusting the separating and forwarding mechanism to bring the same into proper elevational relationship to the height of the bank. This is done by raising and lowering the slides 61 in their guideways by means of a novel driving mechanism, now about to be described.

Extending transversely across the feeder is a cam shaft 68, the ends of which are journalled in suitable bearings carried by the castings 63. Near the inner faces of the castings 63, this shaft has cams 69 fixed thereto and riding on the cams are cam followers 70 carried by levers 71 pivoted from a cross shaft 72 joining the rear lower corners of the castings 63. The opposite ends of these levers are connected to the slides 61 by links 73.

Hence, rotation of the shaft 68 by virtue of the shape of the cams 69 raises and lowers the slides 61 with a uniform motion, depending upon the direction of rotation of the cam shaft; and inasmuch as the separating mechanisms are mounted on the bar 60 which is carried by the slides 61, such up and down adjustment of the slides raises and lowers the separating and forwarding mechanisms as required to maintain the same in proper elevational relationship to the bank.

The means just described for raising and lowering the slides functions at the dictation of control instrumentalities to be hereinafter described, which are responsive to the height of the bank on the lower feed board adjacent to the rear edge of the topmost sheet.

DRIVE FOR RAISING AND LOWERING SEPARATING AND FORWARDING MECHANISMS (Figures 7, 8, 9, 25, 26 and 28. Sheets 4, 5, 6, 15 and 16)

Figure 9:
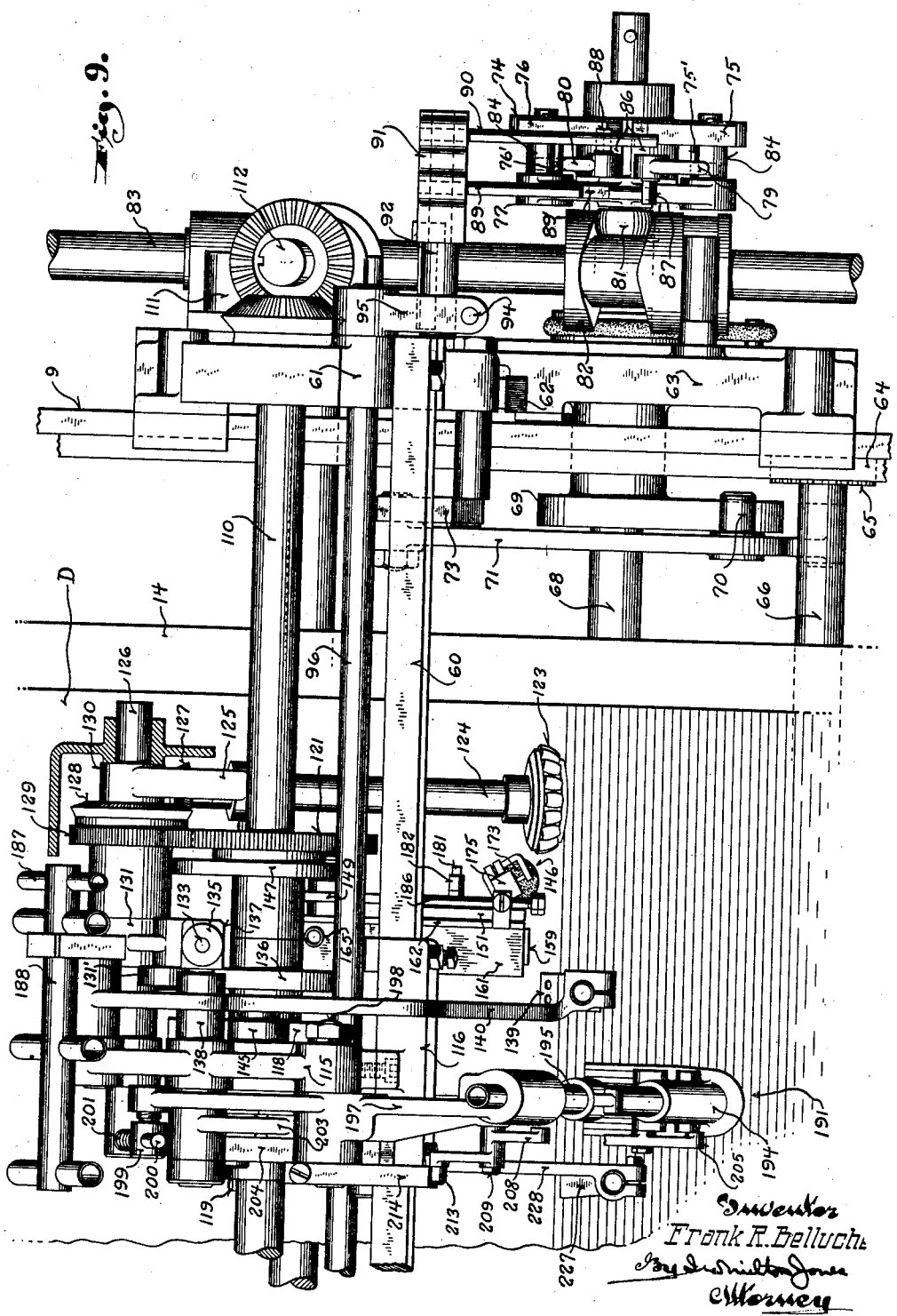
Figure 9 is a top plan view of the gear side separating and forwarding mechanism, and showing the adjacent side frame and the drive for the separating and forwarding mechanisms, said view in conjunction with Figure 8 constituting a complete top plan view taken on a plane between the upper and lower feed boards and directly above the separating and forwarding mechanisms.

The actual drive for the shaft 68, as best shown in Figures 7, 9 and 28, comprises a ratchet wheel 74 fixed to the cam shaft 68 and a set of opposed power driven pawls 75 and 76 which upon engagement with the teeth of the ratchet wheel turn the wheel in one direction or the other.

The ratchet wheel is secured to the shaft 68 at its end portion which projects from the gear side casting 63, and between the ratchet wheel and the casting 63 this shaft pivotally mounts a lever 77. The hub of the lever 77 has an extension 78 upon which two control levers 79 and 80 are mounted. The upper end of the lever 77, which stands in a substantially upright position, carries a roller 81 which constitutes a cam follower and rides in the groove of a barrel cam 82 slidably splined to a shaft 83. The shaft 83 is continuously driven in a manner to be hereinafter described as long as the feeder is in operation. Rotation of the cam rocks the lever 77 back and forth.

Laterally projecting arms on the outer end of the lever have studs 84 fixed thereto on which the pawls 75 and 76 are freely pivoted to occupy positions above the ratchet wheels 74 so as to be engageable with the teeth thereof by gravity whenever permitted. The pawls are held out of engagement with the teeth of the ratchet wheel by the levers 79 and 80 except when improper elevation of the bank at the separating and forwarding mechanisms dictates adjustment by operative engagement between one or the other of the pawls and the ratchet wheel.

To this end, the levers 79 and 80 have abutments 79' and 80' which engage the studs 84, and also pins 75' and 76' fixed to the pawls. A spring 85 connecting the lower ends of the levers 79 and 80 yieldingly maintains the levers in positions at which their abutments 79' and 80' engage the studs 84 of the lever 77. Consequently, unless restrained, the levers 79 and 80 move in unison with the lever 77 as it rocks back and forth, and by engaging the pins 75' and 76', the levers hold the pawls out of engagement with the teeth of the ratchet wheel.

It is to be observed that the hub portions 86 of the levers 79 and 80 merely embrace the hub extensions 78 of the lever 77, and that space is left between the edges of these hub portions which permits either lever to rock a limited extent about the hub extension 78 without affecting the other lever.

It will also be apparent that if one of the levers 79 or 80 is restrained against following its stud 84 as the lever 77 swings in a direction carrying the stud away from the selected lever, the pawl controlled by this lever will be permitted to drop down into engagement with the teeth of the ratchet wheel so that upon the next successive reverse motion of the lever 77, a slight angular motion will be imparted to the ratchet wheel, and consequently the cam shaft 68.

CONTROL FOR PAWLS
*(Figures 7, 8, 9, 23, 24, 24–A, 24–B, and 28. Sheets 4, 5, 6, 14 and 16)*

To restrain the levers 79 and 80 against following the lever 77 whenever operative engagement of one or the other of the pawls with the ratchet wheel is to be established, the lever 79 has a substantially triangular lateral stem 87 projecting from the upper end thereof which, as clearly shown in Figures 7 and 28, extends above the upper end of the lever 80 and the upper end of the lever 80 has a triangular stem 88 projecting laterally therefrom.

These two triangular stems 87 and 88 have flat faces lying in substantially parallel spaced planes. Extending into the space between these planes are the outer ends of two latch rods 89 and 90, the inner ends of which are anchored in the hub portion of a lever 91 freely journalled on a stub shaft 92 projecting from the adjacent gear side casting 63.

The free end portion of the latch rod 89 has a notch 89' providing a hook engageable with the outer lower edge of the stem 87, while the free end of the latch rod 90 is notched as at 90' to provide a hook engageable with the outer upper edge of the stem 88. A spring 93 connected between the lever 91 and a fixed pin yieldingly tends to turn the lever about the axis of its mounting shaft 92 in a direction to swing the latch rods upwardly to engage the notch 89' with the stem 87 of the lever 79.

This tendency of the spring to raise the latch arms as described is opposed by a rod 94 fixed to an arm 95 secured to a shaft 96 positioned above the lever 91. The lower free end of the rod 94 bears against a stop carried by the lever 91 in the form of a screw 97. The screw provides adjustment to insure proper positioning of the latch rods with relation to the triangular stems 87 and 88.

FEELER FOR PAWL CONTROL
*(Figures 7, 8, 9, 23, 24, 24–A and 24–B. Sheets 4, 5, 6 and 14)*

The shaft 96 which carries the arm 95 from which the rod 94 is suspended constitutes part of the feeler mechanism by which variations in height of the bank dictate functioning of the drive for raising and lowering the separating and forwarding mechanism. This feeler, as best shown in Figures 23 and 24, is mounted on the cross bar 60 by means of a bearing bracket 98 clamped thereto.

The inner end of the shaft 96 is journalled in this bracket 98, while the outer end thereof is journalled in a bearing carried by the gear side slide 61. It is to be observed that this shaft 96 extends only to the center of the feeder, as clearly shown in Figure 8.

Fixed to the inner end of the shaft 96 is a curved lever arm 99, the outer free end of which is directed downwardly toward the top of the paper bank where it is pivotally connected to an upwardly and forwardly projecting arm 100 of a feeler shoe 101. The feeler shoe and the arm 100 are one integral casting, and at the juncture thereof axially aligned rollers 102 are mounted to ride on the top of the bank at a point spaced rearwardly from the rear edge of the topmost sheet of the bank.

Thus, in a general sense, as the elevation of the bank top upon which the rollers 102 ride, fluctuates, the shaft 96 through its connection with the rollers 102 is oscillated in one direction or the other to raise or lower the outer free ends of the latch rods in the manner hereinbefore described.

To insure proper elevational relationship between the separating and forwarding mechanisms and the rear edge of the foremost sheet, it is essential that the height of the bank, or in other words, the thickness of the bank directly adjacent to the rear edge of the foremost sheet, shall determine the functioning of the feeler mechanism, but as noted, the rollers 102 ride on the bank at a substantial distance to the rear of the rear edge of the topmost sheet which is necessary to provide the proper clearance for lifting and acting on the rear edge portion of the topmost sheet.

As long as the bank advances without diminution, the elevation of its upper surface at the rollers 102 is substantially equal to the height of the bank adjacent to the rear edge of the foremost sheet (see Figure 24–A), but as the bank runs out, its thickness and consequently the height of its top surface at the rollers 102 decreases before any change takes place in the thickness or height of the bank directly adjacent to the rear edge of the foremost sheet (see Figure 24–B).

Hence, for the feeler mechanism to be accurate, correction is required in its influence upon the control for the pawl and ratchet driving mechanism. This correction is obtained by having the feeler shoe extend rearwardly a substantial distance to rest on the bank top and to tilt downward as the bank runs out. Such tilting of the feeler shoe raises the connection between the arms 99 and 100 to maintain the same at the elevation at which it corresponds to the height of the bank adjacent to the rear edge of the topmost sheet.

The manner in which the tilting of the feeler shoe maintains the point of connection between the lever arms 99 and 100 constant as the bank begins to run out and before decrease in the thickness of the bank adjacent to the rear edge of the topmost sheet has begun is illustrated in dotted lines in Figure 24.

The feeler shoe is yieldingly urged down onto the bank by a compression spring 103 bearing against an arm 104 extended outwardly from the mounting bracket 98 and coiled about a guide rod 105 which bears down against the feeler shoe rearwardly of the axis of the rollers 102. Thus, it will be apparent that the shoe 101 at all times lies flat on the top of the bank.

It is to be understood that as the bank continues to run out and its thickness at the rear edge of the foremost sheet decreases, the descending feeler causes the pawl and ratchet mechanism to continue operation in the direction necessary to bring the bar 60, and consequently, the separating and forwarding mechanisms, down until the lowermost position is reached at which the foremost sheet is directly on the lower table of the feeder.

Continued operation of the pawl and ratchet driving mechanism beyond this point is precluded by a blank area 106 on the ratchet wheel 74. This blank area 106 also precludes elevation of the separating and forwarding mechanisms above a predetermined height.

The mechanisms may also be raised and lowered manually by means of a crank (not shown) applied to the end of the shaft 68 which projects beyond the ratchet wheel 74 (see Figure 9).

Figure 2:
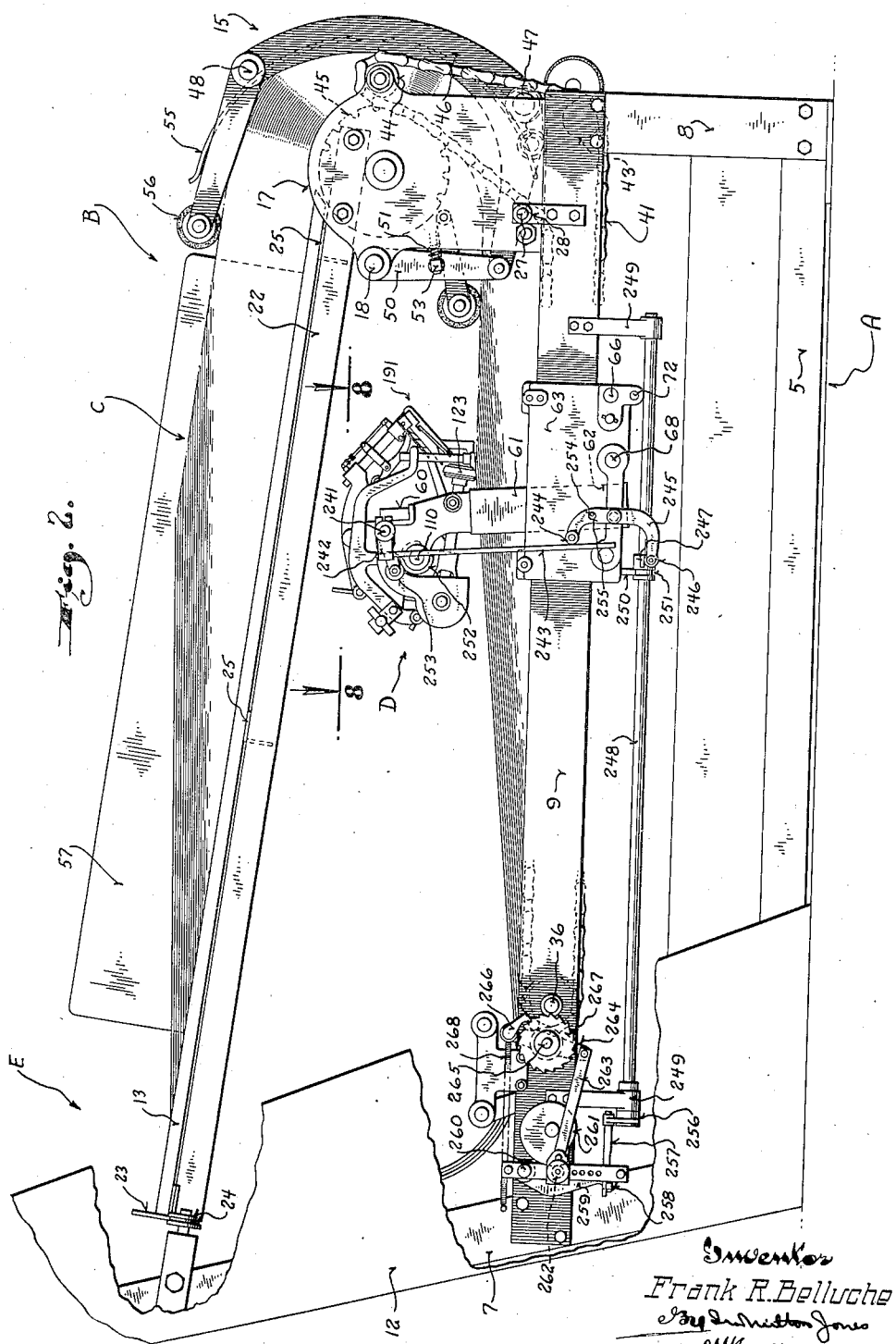
Figure 2 is a feed side view of the lower portion of the feeder, with parts broken away to illustrate structural details.

As clearly illustrated in Figures 2, 7 and 25, the guideways 62 of the castings 63 in which the slides 61 are mounted are inclined toward the front of the feeder so that the slides and the entire structure carried thereby move with a translating motion along a line inclined to the vertical. The inclination of this line of motion is determined by the angle taken by the chord of an arc formed by the rear edge of a sheet of the average length for which the machine is designed, as it is swung about an axis defined by the engagement of the front edge of the sheet with the front edge portion of the lower feed board, from a position flat on the board to the height such sheet assumes when the bank has its maximum thickness.

By virtue of this inclination to which the up and down motion of the separating and forwarding mechanisms are constrained, it will appear that absolute accuracy can be maintained in the edgewise relationship of the topmost sheet to the separating and forwarding mechanisms throughout the entire operation of the feeder and regardless of the bank thickness.

WORK ENGAGING UNITS OF SEPARATING AND FORWARDING MECHANISMS (Figures 8, 9, 12, 13, 14, 15, 17, 18 and 19. Sheets 5, 6, 8, 9, 10, 11 and 12)

The actual separating and forwarding mechanisms, i. e., the work engaging units, of which there are two in the present embodiment of the invention, are substantially identical so that a description of one will suffice for both. The only difference between the two units is that the feed side unit includes a trigger for coaction with the rear edges of the sheets to control the functioning of the bank advancing means, whereas the gear side unit does not have this trigger arrangement.

As noted hereinbefore, both mechanisms or units are slidably mounted upon the transverse bar 60 to permit the same to be adjusted transversely to accommodate sheets of different widths. While the bar 60 constitutes the primary support for the separating and forwarding units, they are also supported by a transverse drive shaft 110 journalled in bearings carried by the slides 61. This transverse shaft drives the cams of the separating and forwarding units, and to this end is longitudinally splined to have driving connection with the cams in any adjusted position of the units.

At the gear side of the feeder, this shaft 110 has a bevel gear driving connection 111 with an upright shaft 112 journalled in bearings carried by the adjacent slide 61 and casting 63. The lower end of the shaft 112 has a bevel gear driving connection 113 with the continuously rotating shaft 83.

The bevel gear on the shaft 112 of the gear connection 111 is held against axial movement by its bearing in which it is journalled, and is slidably splined on the shaft 112 to accommodate the up and down adjustment of the separating and forwarding units, and to accommodate longitudinal adjustment of the entire separating and forwarding structure, the shaft 83 is longitudinally splined.

Each separating and forwarding unit has a supporting frame 115 clamped to the transverse bar 60 by a cap 116, which upon being loosened permits sliding the frame along the bar to effect the desired transverse adjustment of the unit. The shaft 110 passes through the frame 115 and provides support therefor. To this end, the frame has the hub 117 of a presser foot lifting cam 118 journalled therein, and the cam 118, as well as the other cams of the unit, as noted hereinbefore, is mounted on the shaft.

A key 119 held in place by screws threaded into the end portions thereof with their heads engaging adjacent walls, one of which is provided by a combing wheel driving gear 121, and the other by the hub of a gripper motion controlling cam 122, provides a slidable driving connection between the shaft 110 and the cams.

Figure 8:
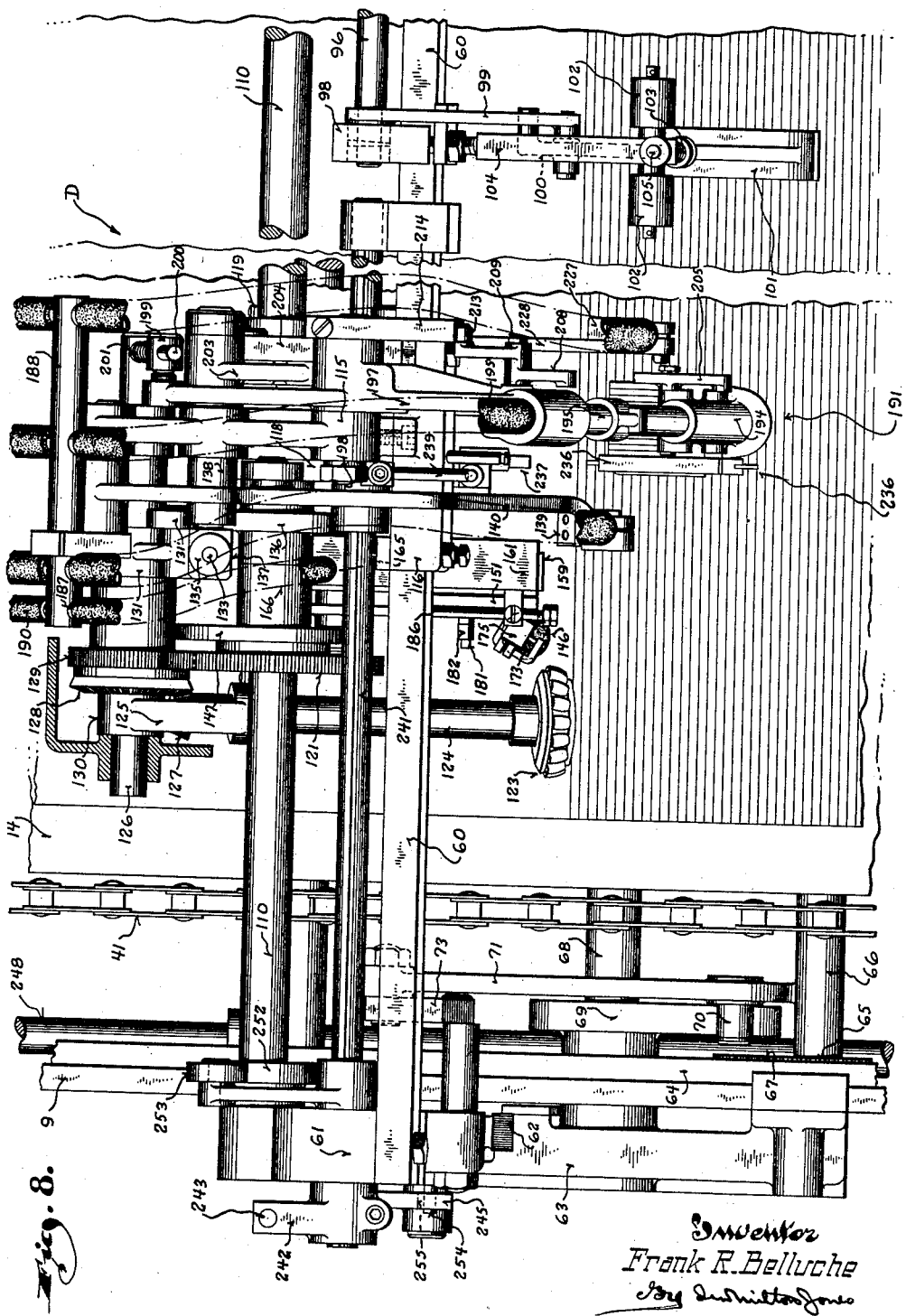
Figure 8 is a top plan view of the feed side separating and forwarding mechanism, and illustrating part of the adjacent side frame.
Figure 12:
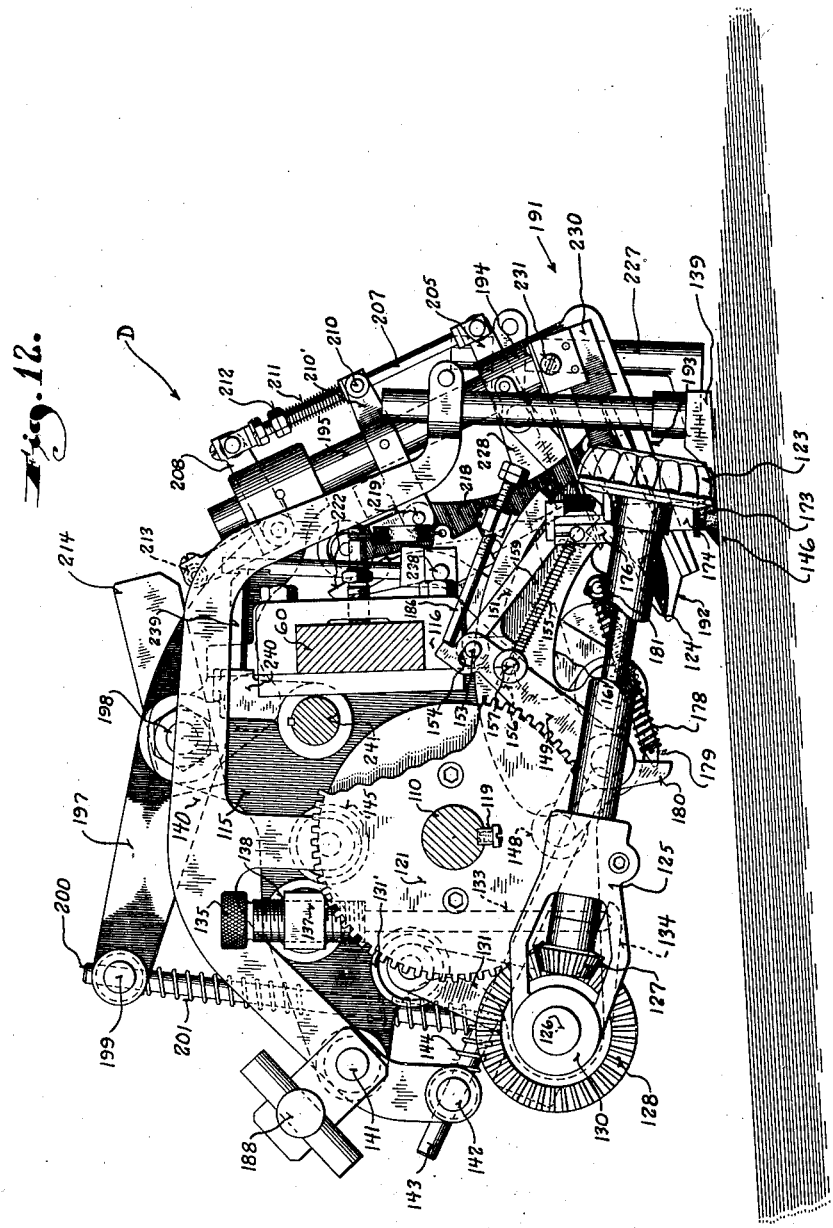
Figure 12 is an enlarged side view of the feed side separating and forwarding mechanism taken from the feed side of the machine, with parts broken away and in section, and showing the mechanism about to pick up a sheet.

COMBING WHEEL (Figures 8, 9 and 12. Sheets 5, 6 and 8)

On its outer side, the unit carries a combing wheel 123 of more or less conventional construction. The drive shaft for the combing wheel is enclosed within a tube 124 extended from a yoke 125 pivotally mounted on a stationary shaft 126 anchored in the frame 115. The yoke 125 is formed to accommodate a bevel pinion 127 fixed to the shaft of the combing wheel and meshing with a bevel gear 128.

The hub of the bevel gear 128 has a spur gear 129 fixed thereto and is journalled on the hub 130 of the yoke 125. The inner end of the hub 130 extends beyond the hub of the bevel gear 128 and has a cam follower lever 131 clamped thereto so that any motion of this cam follower lever is transmitted to the yoke, and consequently, the combing wheel.

A compression spring 132 coiled about a guide rod 133, the lower end of which bears down against an arm 134 extended inwardly from the lever 131, and the upper end of which bears against an adjustable hollow screw 135 anchored in a manner to be described, yieldingly urges the lever 131 in a direction to maintain its cam follower roller 131' on a cam 136.

The hollow adjusting screw 135 is threaded in a stud 137 mounted on a short stationary shaft 138 fixed in the frame, the screw 135 being hollow, slidably receives the adjacent upper end of the spring guide stem 133.

The cam 136, as illustrated in Figure 13, is shaped to hold the combing wheel off the bank throughout the major portion of the cycle and to allow it to descend onto the bank at the proper time. The combing wheel is continuously driven from the main transverse drive shaft 110 by the gear 121 which meshes with the spur gear 129.

PRESSER FOOT (Figures 8, 9, 12 and 13. Sheets 5, 6, 8 and 9)

The combing wheel cooperates with a presser foot 139 which presses down on top of the bank throughout the major portion of the cycle and is lifted only for the short interval required for picking the top sheet off the bank. This presser foot, which also constitutes a blowing nozzle, has its hollow stem adjustably secured to the free end of a supporting lever 140 pivoted near its opposite end on a short stationary shaft 141 fixed in the frame.

The pivoted end of the supporting lever extends beyond the shaft 141 and carries a stud 142 through which a spring guide rod 143 slidably projects. A spring 144 coiled about this stem and having one end bearing against the stud 142, while its other end bears against a pin carried by the stem, yieldingly urges the lever 140 about its pivotal support to maintain its cam follower roller 145 in contact with the cam 118. The lower end of the spring guide stem 143 bears against a suitable fixed support carried by the frame.

SUCKER (Figures 8, 9, 12, 13, 17 and 18. Sheets 5, 6, 8, 9 and 11)

Between the combing wheel 123 and the presser foot 139 is a sucker 146 which engages the hump curled into the paper by the combing wheel crowding the top sheets toward the lowered presser foot to successively lift the rear edge portion of the topmost sheet.

This sucker, which is of novel construction to be hereinafter more fully described, is controlled by a sucker lifting cam 147 secured to the inner face of the hub of the gear 121. Its cam follower roller 148 is carried by a bell crank lever 149 pivotally mounted on a stationary stub shaft 150 anchored in the bottom of the frame. The long arm of the bell crank lever 149 extends upwardly alongside the cam 147, and has its upper end connected through a link 151 with a special stud 152 which carries the sucker.

The connection between the link 151 and the bell crank lever 149 incorporates a degree of lost motion and is formed by a stud 153 fixed to the upper end of the link 151 and received in an elongated slot 154 in the lever 149. A light compression spring 155 coiled about a guide stem 156 takes up the lost motion in the connection between the link 151 and the lever 149.

For this purpose, the upper end of the guide stem 156 is slidable in a hole through a stud 157 secured to the lever 149 and the adjacent end of the spring bears against stud 157. The opposite lower end of the guide stem bears against a shoulder 158 on the link 151 and carries an abutment against which the adjacent end of the spring engages. The purpose of the lost motion in the connection between the link 151 and the lever 149 will be brought out hereinafter.

The stud 152 is anchored in a block-like longitudinally arcuate plunger 159 which is slidable in an arcuate track 160 of a housing 161. A cover plate 162 secured to the housing over the track holds the plunger in place and closes the track to form a plunger chamber, the cover plate having an arcuate slot 163 to accommodate the stud 152.

The housing 161 is mounted on the short stub shaft 150 and a similar shaft 164, both carried by the frame 115. At its inner end, the track 160 has a suction port from which a nipple 165 extends to provide for the attachment of a hose 166 whereby suction may be established within the track or plunger chamber to draw the plunger upwardly with an arcuate motion.

The plunger, however, has a longitudinal port 167 leading from its inner end to a transverse bore 168 in which the stud 152 is seated, and the stud 152, as best shown in Figure 18, has a passage 169 leading from a port 170 in line with the port 167 to a downward opening port 171 in its outer end portion 172 upon which the sucker is pivoted.

The sucker per se consists of a suction cup 173 on the lower end of a tube 174, the upper end of which has an enlarged head 175 to pivotally fit the stud portion 172 where it is held by a block 176 clamped to the reduced end 177 of the stud. The bore of the tube 174 opens to the bore in the head 175 so that communication is established from the suction cup through the stem 152 to the port 167 in the plunger which opens to the cavity 160.

Consequently, the suction cup is connected with the suction source so that upon descent of the sucker, the sheet is drawn to the suction cup to seal it, whereupon the plunger is immediately drawn inwardly the amount permitted by the lost motion in the connection between the link 151 and the lever 149, hereinbefore described.

The mechanism is so timed that directly following the sealing of the suction cup and the initial lifting of the sucker, as defined, the cam 147 acting through the lever 149 and the link 151 draws the stud 152 upwardly along the arcuate path defined by the plunger track 160.

The cam produced motion is opposed by a compression spring 178 coiled about a guide stem 179. The lower end of the guide stem bears against an abutment 180 on the lever 149, and its outer end is slidably received in a hole through a pin 181 which is anchored to the housing 161. One end of the spring bears against the pin 181, while its other end bears against an abutment carried by the stem 179. The spring 178 thus also serves to hold the roller 148 in engagement with its cam 147.

Attention is directed to the peculiar formation of the stud 152. It is to be observed that the axis of its portion 172 upon which the sucker is pivoted is disposed at an angle to the axis of its portion secured in the plunger. By virtue of this angularity, the sucker can be given an outward swinging motion in a diagonal direction substantially to the rear and side of the sheet, whereupon the sheet is stretched transversely across the rear edge and is given a rearward pull, as illustrated diagrammatically in Figure 22.

Swinging motion is imparted to the sucker as it is lifted, by having its tube 174 bear against the pin 181 as the sucker rises, a roller 182 being preferably provided for the pin 181 to insure freedom of action as the sucker tube engages the same during its ascent and descent.

A light tension spring 183 having one end hooked into an eye 184 extending out from the upper end of the sucker tube, and its other end hooked onto a spring support 185 fixed to the block 176 yieldingly holds the sucker tube against the pin 181.

In normal operation of the feeder, the sucker descends only far enough to engage the hump formed by the combing wheel, but when no paper is present, the descent of the sucker is limited by an adjustable stop pin 186 carried by the plunger housing 161 in position to engage the outer end of the lever 149. Through adjustment of the stop 186, the extent to which the sucker descends may be set to accommodate paper of different types.

The suction hose 166 which leads from the nipple 165 connects with one end of a nipple 187 carried by a shaft 188 supported from the stub shaft 141, which is anchored in the frame 115. The opposite end of the nipple 187 has a hose 190 attached thereto by which the sucker is connected with a suitable source of suction.

The shaft 188 also has other nipples similar to the nipple 187 extending diametrically therethrough to provide convenient means for connecting the presser foot 139 and two other blowers hereinafter to be described, with sources of air under pressure.

SHEET FORWARDING GRIPPER (Figures 8, 9, 12, 13, 14, 15 and 19. Sheets 5, 6, 8, 9, 10 and 12)

As will be readily apparent, the combing wheel combs the upper sheets toward the presser foot to raise a hump in the sheets to thereby effect preliminary separation of the sheets and enable the sucker to pick up the top sheet. As has been brought out, when the sucker takes hold of the top sheet, it immediately rises with an arcuate motion, and at the same time swings diagonally outward to stretch the sheet transversely and give it a slight rearward pull to take out the slack and facilitate the winding of the sheet.

The sucker in performing these functions lifts the rear edge of the sheet upwardly into the path of an arcuately swinging gripper, designated generally by the numeral 191, which takes hold of the sheet and advances it forwardly into the bite of the customary feed off rolls located near the front edge of the lower feed board. While the gripper may be said to forward the sheets, actually, however, the sheet is floated forwardly by the air blown under it. The gripper merely controls its advance.

Figure 19:
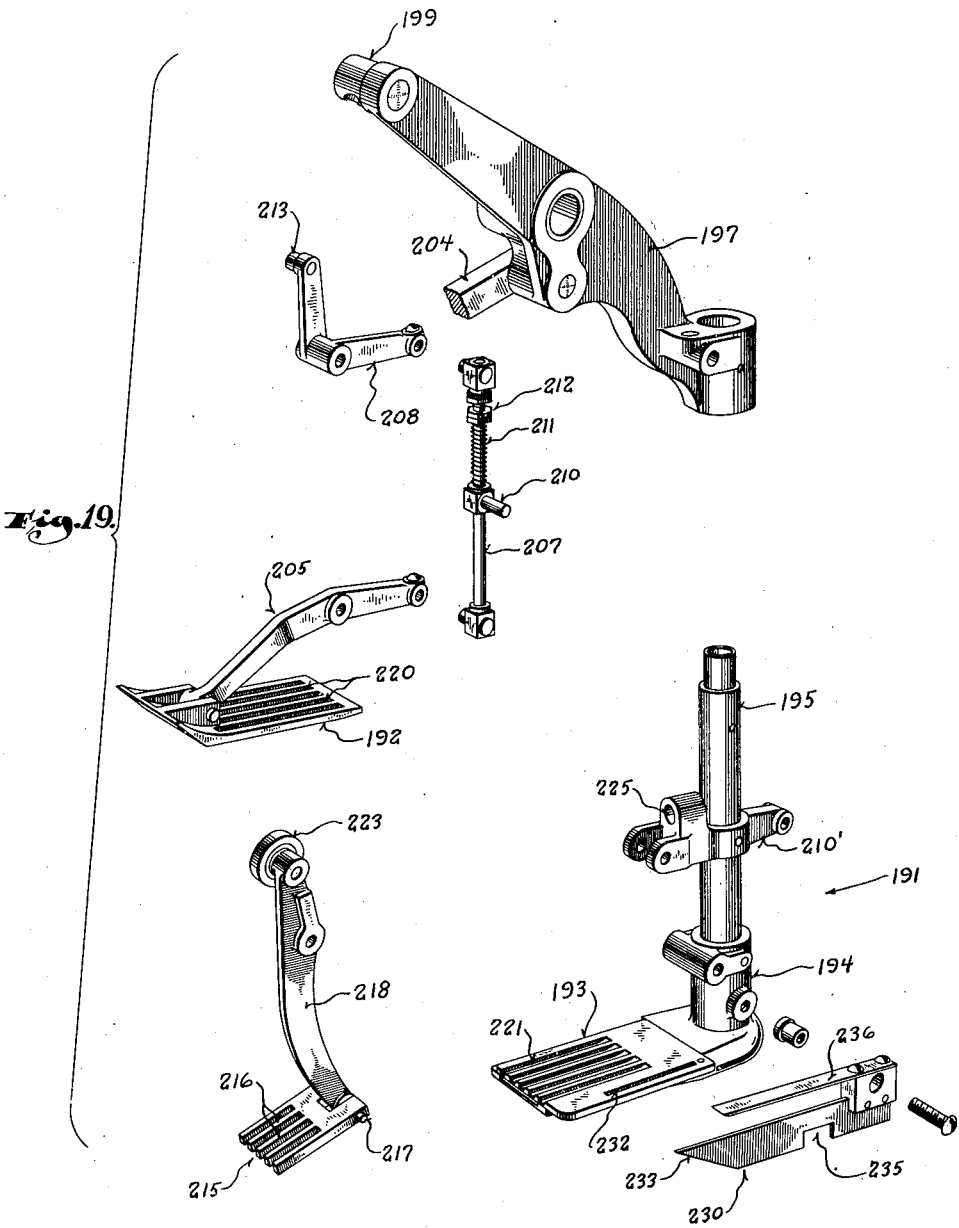
Figure 19 is a perspective view of the gripper and straightener disassembled and with the parts thereof approximately in their order of assembly.
Figure 20:
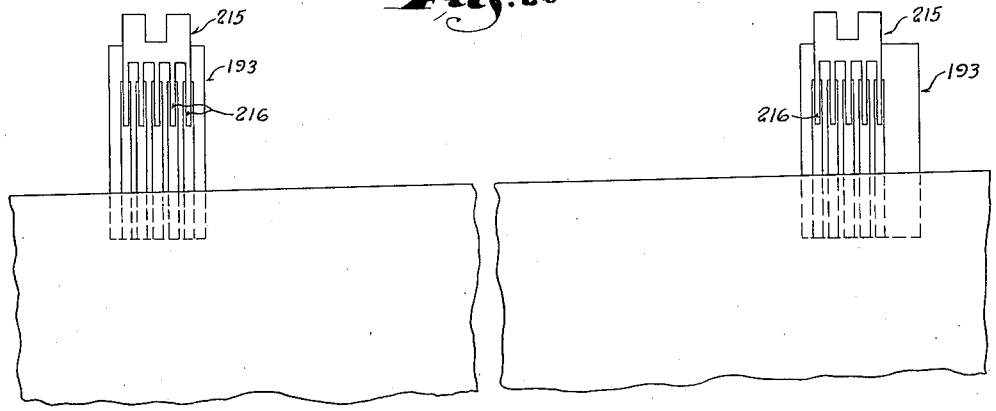
Figures 20 and 21 are diagrammatic views illustrating the manner in which the sheet straightener functions.
Figure 21:
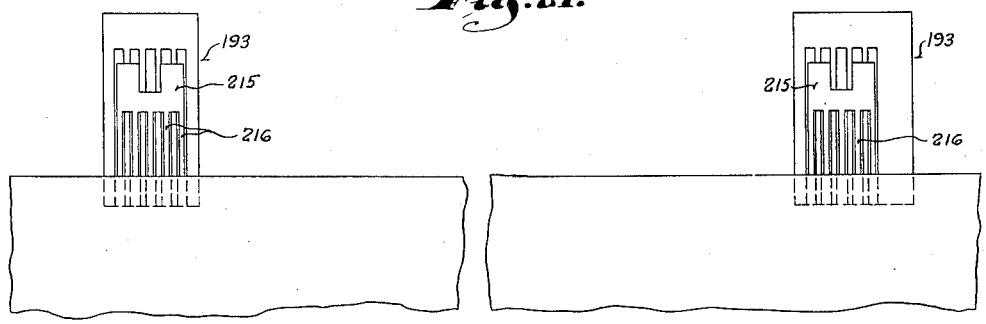
Figure 22:
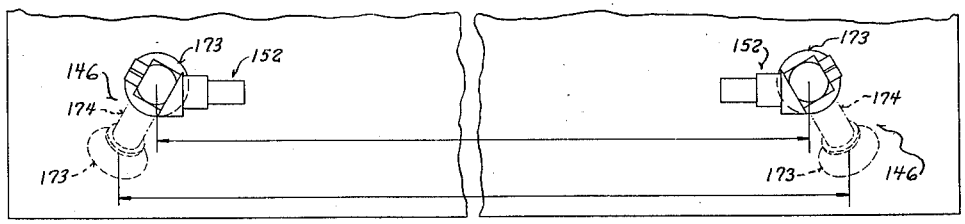
Figure 22 is a diagrammatic view illustrating the manner in which the sheets are simultaneously stretched transversely and given a rearward pull as they are lifted by the suckers of the separating mechanisms.

The gripper consists of complementary upper and lower jaws 192 and 193, respectively, between which the sheet is gripped. The lower jaw, as best shown in Figure 19, has substantially the shape of a foot with an upwardly projecting boss 194 on its heel.

Secured in this boss is a tube 195, which, besides providing a mounting for the entire gripper, provides an air inlet to the lower jaw which is hollow and has a flat discharge nozzle in its front edge to direct a blast of air under the sheet engaged by the gripper. Air is supplied to the tube 195 through a hose 195' which leads to one of the nipples on the shaft 188, and a hose which leads from this nipple to a source of supply. The customary valve is provided to control the flow of air to the gripper, and this valve is operated in such timed relation that the blast continues to issue from the gripper throughout the forwarding stroke.

The tube 195 is secured to one end of a lever 197 medially pivoted on a stub shaft 198 fixed in the upper portion of the frame 115. The opposite end of the lever 197 pivotally carries a stud 199 having a hole diametrically therethrough to slidably receive the upper end of a spring guiding stem 200. The opposite end of this stem rests on the stationary shaft 126, and a compression spring 201 coiled about the stem and having one end engaging an abutment on the stem and its opposite end bearing against the stud 199, yieldingly tends to move the lever 197 and the gripper carried thereby in a sheet forwarding stroke.

The spring propelled motion of the gripper is controlled by the cam 122 through a cam follower 202 carried by a lever 203 pivoted on the stationary shaft 138 and connected with the lever 197 by a link 204. Thus it will be seen that the gripper moves in an arc swung about the axis of the shaft 198 with a forwarding motion produced by the spring 201 under control of the cam 122 which returns the gripper to its retracted position.

The upper gripper jaw 192 is pivoted to one end of a lever 205 which is medially pivoted, as at 206, to the top of the boss 194. The opposite end of the lever 205 has the lower end of a connecting rod 207 connected thereto, the upper end of which is pivotally connected to one arm of a bell crank lever 208, which is pivoted at its apex on a pin 209 anchored in the end of the lever 197 adjacent to its connection to the tube 195. Hence, it will be seen that angular motion of the bell crank lever 208 tilts the lever 205 about its pivotal mounting to raise and lower the upper gripper jaw 192 with respect to the lower jaw 193.

Inasmuch as the lever 205 is the only support for the upper gripper jaw, it is apparent that its rear end hangs by gravity onto the top surface of the lower jaw 193, while the forward end thereof, which flares upwardly to facilitate engagement of the gripper over the edge of the sheet, is raised and lowered with the motion of the lever 205.

The connecting rod 207 has its medial portion slidably received in a hole passing through a stud 210 anchored in a bracket 210' which is secured to the tube 195. Resting on this stud and encircling the upper portion of the connecting rod is a compression spring 211, the upper end of which bears against a spring abutment provided by nuts 212 threaded on the upper end of the connecting rod.

The spring 211 thus yieldingly urges the connecting rod 207 upwardly to urge the upper gripper jaw down onto the lower jaw, and as will be apparent, the spring tension for closing the gripper is derived from this spring. The spring also holds the bell crank lever 208 in a position at which a roller 213 carried by the vertical arm of the bell crank lever is engageable with a stationary cam 214 mounted on the shaft 198.

The position of the cam 214 with relation to the roller 213 is such that as the gripper assembly swings forwardly in its sheet forwarding stroke, the roller 213 engages the cam to be moved thereby, as shown in dotted lines in Figure 14. It is to be observed, however, that the direction of motion of the lever moving with the gripper assembly is such that the roller 213 has only a transient engagement with the cam 214. During the interval of this engagement, the bell crank lever is swung on its pivot in a direction to lift the upper gripper jaw and permit engagement of the gripper over the rear edge of the sheet.

SHEET STRAIGHTENER (Figures 8, 9, 12, 13, 14, 15, 19, 20 and 21. Sheets 5, 6, 8, 9, 10, 12 and 13)

As the gripper swings forwardly in its advancing stroke, the sheet gripped thereby is straightened across its rear edge by means of a sheet straightener 215. The sheet straightener, as best shown in Figure 19 comprises a rake-like member having a plurality of parallel teeth 216, the ends of which lie in a common plane. The closed rear end of the straightener is pivotally connected, as at 217, to the lower end of a lever 218 medially pivoted from the bracket 210' by a pin 219.

The lever supports the straightener above the gripper jaws in a position at which the fingers 216 of the straightener hang down through elongated slots 220 in the upper gripper jaw 192, and into elongated grooves 221 in the upper face of the lower jaw 193. The aligned front ends of the straightener fingers thus extend across the plane of juncture between the gripper jaws to be engageable with the edge of a sheet in the bite of the jaws.

Consequently, upon forward motion of the straightener with relation to the gripper jaws, the sheet is pushed forwardly toward the mouth of the jaws to a predetermined position. Such motion is imparted to the straightener at a time just prior to the end of the sheet forwarding stroke of the gripper, by means of a stationary cam 222 mounted on the stationary stub shaft 164 engaging a roller 223 carried by the upper end of the lever 218.

Figure 14 illustrates the gripper assembly in full lines in its position at approximately the point in the cycle at which the sheet being forwarded is taken by the feed off rollers at the front of the feeder, and at this instant the sheet straightener has completed its function.

The cam propelled motion imparted to the sheet straightener in the manner described is in opposition to a return spring 224 seated in a bore 225 in the bracket 210' and having one end bearing against the tube 195 and its opposite end engaging in a recess in the adjacent portion of the lever 218 (see Figure 13).

As has been hereinbefore stated, in feeders designed for narrow sheets, a single separating and forwarding unit may be sufficient, even to the straightening of the sheet at its rear edge, but for wider sheets, as in the embodiment illustrated, two separating and forwarding units are employed. In this instance, the two units, and particularly the sheet straightening means thereof, are carefully adjusted to be in transverse alignment. The manner in which they coact to effect straightening of the sheet is diagrammatically illustrated in Figures 20 and 21.

The blasts of air issuing from the lower gripper jaw and the presser foot, which wind the sheet, are augmented by a blast directed from an auxiliary blower nozzle 227 adjustably clamped to an arm 228 extending rearwardly from the separator mechanism. This nozzle is connected with the source of air under pressure in the customary manner.

BANK ADVANCE (Figures 2, 8, 13, 14, 15, 16, 19, 25, 26, 29 and 30. Sheets 2, 5, 9, 10, 12, 15 and 17)

The bank advance is governed by mechanism controlled by a trigger 230 cooperable with the rear edge of the topmost sheet. This trigger is carried by one of the separating and forwarding units and is pivotally mounted as at 231 from the boss 194 of the lower gripper jaw. In this manner, the trigger or feeler extends edgewise over the superimposed gripper jaws and hangs down through a slot 232 in the lower gripper jaw to be located directly alongside the movable upper gripper jaw.

The forward end of this trigger or feeler has its lower edge inclined upwardly as at 233. Hence, in its normal free position, this inclined edge crosses the plane formed by the top surface of the lower gripper jaw to be engaged and lifted by the rear edge of a sheet as it moves into the bite of the gripper jaws.

Descent of the trigger or feeler is limited by an adjusting screw 234 threaded into the lower gripper jaw and engageable with the inner edge of a notch 235 cut in the bottom of the trigger or feeler near its pivoted end.

The pivoted end of the trigger or feeler has a latch releasing finger 236 secured thereto to move in unison therewith. This latch releasing finger coacts with a latch 237 pivoted as at 238 from the clamp 116. The lower end of this latch releasing finger is so positioned with relation to the arcuate swinging motion of the gripper assembly as to be engaged by the finger 236 in the event the trigger or feeler is lifted beyond a predetermined height, which occurs in the event the sheet engaged by the gripper is insufficiently advanced with relation to the separating and forwarding mechanism.

When this occurs, the upper end of the latch is moved out of line with the outer hooked end of a keeper 239 which is cam actuated to rise and descend. When the latch is in its normal position, the keeper is restrained against following the cam by being hooked onto the latch, but when the latch is moved out of keeper engaging position in the manner defined, the keeper is free to follow the cam, and the additional motion thus produced is utilized to initiate the functioning of the bank advance.

The keeper is mounted on an arm 240 fixed to a shaft 241 which extends from the center of the machine to the feed side of the machine. It is longitudinally splined throughout its length to permit transverse adjustment of the keeper with the separating and forwarding unit on which it is mounted, and is journalled in bearings carried by the frame 115 of this unit and the feed side slide 61.

At its extreme outer end, the shaft has an arm 242 clamped thereto from the outer end of which a rod 243 extends downwardly to engage a roller 244 carried by the upper end of a bell crank-like lever 245. This lever is pivotally mounted medially of its ends on the adjacent casting 63, and its lower end carries a roller 246 which engages under a finger 247 slidably splined to a shaft 248 which extends longitudinally along the feed side of the feeder.

This shaft is journalled in bearings carried by brackets 249 suspended from the adjacent side rail 9, and the finger 247 is held against axial motion with respect to the casting 63 by a lug 250 projecting down from the casting into an annular groove 251 in the hub of the finger. Hence, the finger moves back and forth with the separating and forwarding unit as it is adjusted longitudinally of the feeder.

Figure 1:
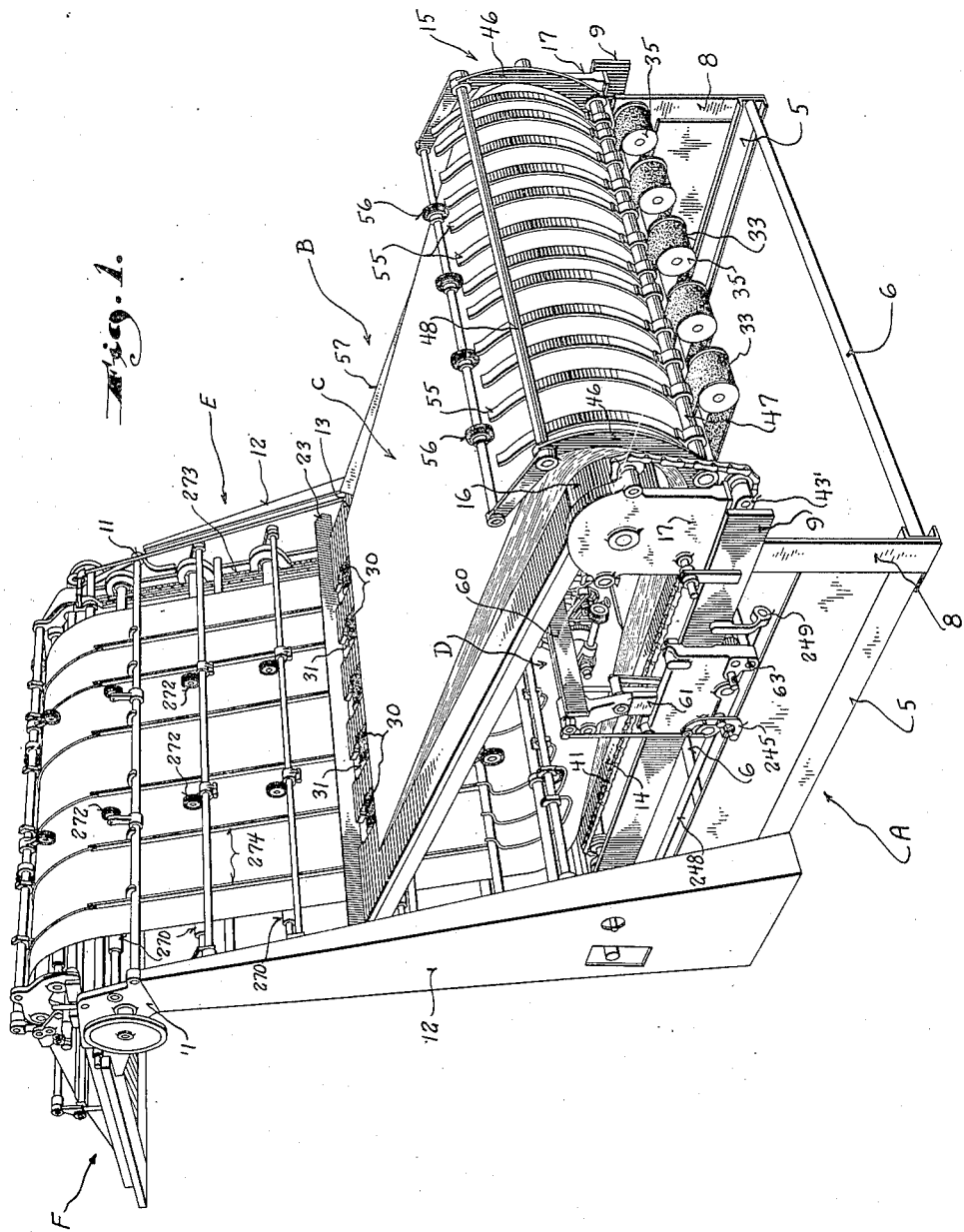
Figure 1 is a perspective view of the entire feeder.

Oscillation of the shaft 241 in a counterclockwise direction, as viewed in Figures 1 and 16, thus imparts rotation to the shaft 248 through the rod 243 and the medially pivoted lever 245 acting on the finger 247. The cam 252 for producing this motion is fixed to the cam shaft 118 adjacent to the feed side slide in position to have a cam follower 253 carried by an arm which is fixed to the shaft 241, ride thereon.

As pointed out hereinbefore, the latch keeper, and consequently the shaft 241, are normally restrained against following the cam by the latch 237 so that as long as the latch is engaged, the only motion which the shaft has is one sufficient to disengage the hook of the keeper from the hook on the latch, and this motion merely carries the rod 243 a slight distance away from the roller 244. However, in the event the latch is disengaged from the keeper, the entire motion permitted by the flat spot of the cam 252 is available to turn the shaft 248.

The extent to which the shaft 248 may be turned is limited by a pin 254 fixed to the adjacent slide 61 and entering a hole 255 in the lever 245. The difference in the diameters of the hole and pin defines the limits of movement of the lever, and consequently the motion capable of being transmitted to the shaft 248 by the lever.

The weight of the finger 247 and of a lever 256 and a latch bar 257 extended therefrom, tends to turn the shaft 248 in a direction to cause the lever 245 to normally lean toward the rod 243 an amount limited by the pin and hole 254 and 255.

The latch bar 257 in this normal position of the parts engages a keeper 258 fixed to the lower free end of a level 259 pivoted to the side bar 9, as at 260. When the latch bar is engaged with this keeper, the lever is restrained against following a cam 261, which it engages through a roller 262.

The lever 259 is connected through a link 263 with a rocking arm 264 mounted for oscillation about the axis of a shaft 265 which carries the pinion 40. The opposite end of the lever arm 264 has a pawl 266 engageable with a ratchet wheel 267 to turn the pinion 40 and drive the bank supporting tapes in an advancing direction.

A spring 268 connected to the lever 264 retracts the pawl and also attempts to cause the cam follower roller 262 to follow the cam. Hence, when the latch 257—258 is disengaged, the roller 262 follows the cam to retract the pawl, whereupon the cam positively drives the mechanism to advance the bank one notch.

Adjustment of the extent of bank advance derived from one operation of the driving mechanism is obtained by varying the point of connection between the lever 259 and the link 263.

Obviously, the bank advancing mechanism continues to operate in the cycles described until the bank has been brought to its proper position at which the rear edge of the topmost sheet is properly positioned with relation to the separating and forwarding mechanisms.

UPRIGHT CONVEYOR E (Figures 1, 2, 31, 32, 33, 34 and 35. Sheets 1, 2, 18, 19 and 20)

The upright conveyor E is supported by the inclined uprights 7 and comprises a plurality of superimposed driven shafts 270, each carrying a number of rollers 271, which together with idler rollers 272 advance the layer of seriated sheets upwardly.

The shafts 270 have sprockets fixed to their gear side ends which mesh with a sprocket chain 273 on the gear side of the feeder. Besides the rollers 271 and 282, there are longitudinal guides, generally termed sticks, 274 by which the sheets are guided in their upward travel.

The sprocket chain 273 runs over a driving sprocket 276 driven from the main power input and extends downwardly along the gear side of the upright conveyor with its two stretches suitably guided and with one stretch held in mesh with the sprocket wheels carried by the shafts 270.

At its lower end, the chain is trained over idler pulleys 277 and 278 and over a power take-off sprocket 279 fixed to a shaft which is drivingly connected through bevel gears 280 with the shaft 83. Thus, the chain 273 transmits the drive from the power input to the shaft 83.

The shaft of the driving sprocket 276 is journalled in bearings carried by the castings 11 at the upper ends of the uprights 7. On the gear side of the feeder, the casting 11 also carries the clutch controlled power input by which the feeder is driven from the press or other machine G (see Figure 31).

The drive is carried from the press or other machine by means of a suitable shaft 283 which is drivingly connected through bevel gears 284 with a clutch shaft 285 under the control of a clutch 286. When the clutch is engaged, the drive is transmitted to the shaft of the driving sprocket 276 by a driving gear 287 fixed to the inner end of the shaft 285.

TOP CONVEYOR F (Figures 1, 31, 32 and 33. Sheets 1, 18, 19 and 20)

The top conveyor F extends substantially horizontally from the top of the conveyor E to receive the sheets therefrom and carry them to the press.

It comprises a frame structure including two longitudinal side rails 288 which have their rear ends slidably received in brackets 289 hingedly supported from the castings 11 by stub shafts 290 secured in the castings 11. The forward ends of the side rails 288 support the trip mechanism, indicated generally by the numeral 291, which shuts down the feeder in the event of more than one sheet reaching the same at a time, and in the event of other objectionable sheet conditions, as is customary.

The trip mechanism is driven by a shaft 292 slidable and rotatable in a driven clutch member 293. This clutch member is journalled in a bracket 294 mounted on a stub shaft 295 from the gear side casting 11, the stub shaft having a hole diametrically therethrough to accommodate the shaft 292.

The clutch member 293 is carried by the hub of a bevel gear 296 which meshes with a bevel gear 297 driven through a suitable gear train from the main clutch shaft 285, and has a one position driving connection with a clutch member 298 fixed to the adjacent end of the shaft 292.

This manner of driving the shaft 292 permits the upper conveyor to be racked back, as will be described, and insures reestablishment of the driving connection to the front trip mechanism in proper timed relation to the feeder upon returning the top conveyor to its operative position.

Supported on the side rails 288 are boards 300 upon which the sheets rest as they are advanced along the conveyor by tapes 301 which ride along over the boards, being trained over suitably positioned idler pulleys, and over a driving pulley 302 which is driven through a suitable train of gears from the driving gear 287.

The entire upper conveyor is so constructed as to be movable bodily with relation to the upright conveyor, and to this end, racks 303 are carried by the side rails 288 and mesh with pinions 305 fixed to a pinion shaft 306. The pinion shaft is adapted to be crank operated to rack back the top conveyor, as indicated in dotted lines in Figure 31. During this racking back of the top conveyor, the tapes merely become slack and the entire structure slides back in the brackets 289.

As it approaches the limit of its rearward motion, the rear end of the upper conveyor overbalances compression springs contained within telescoping supports 307, the lower ends of which are hinged to the side rails 9, as at 308. The upper conveyor thus takes the position indicated in dotted lines in Figure 31, and as will be readily apparent to those skilled in this art, this manner of racking back the top conveyor has the advantage of clearing the feed board 309 of the press without necessitating a great amount of head room, which is necessary where the conveyor is swung upwardly on a hinge, and in addition, has the further advantage of clearing the entire board, for as the conveyor reaches its rear position, it tilts upwardly to permit sheets to be pushed under its front end.

Although but a minor detail, attention is directed to the fact that the valves which control the connection of the blowers and suckers with their respective sources of air under pressure and vacuum, and which are contained within a valve casing 310 mounted adjacent to the throat of the feeder on the gear side, are controlled by cams 311 fixed to the shaft 83. The customary connections, which need not be described, lead to and from the valve housing.

OPERATION

Assuming that the various adjustments have been made to accommodate sheets of a given size, and the feeder has been loaded properly by placing fanned out banks of sheets on the upper feed board and actuating the bank advance, which can be effected manually, until the entire bank is in its proper feed off position, the operation of the feeder from this point is as follows.

The combing wheels of the separating and forwarding mechanism and the presser feet thereof first descend onto the rear edge portion of the topmost sheet near its side edges and act thereon to comb humps into the rear edge portions of the uppermost sheets.

The suckers of the separating and forwarding mechanisms then descend onto the humps and pick up the topmost sheet, gripping the same near its rear corners. As the suckers are lifted, they are given a diagonally outward swinging motion, which not only stretches the sheet transversely, but also pulls it rearwardly to straighten the same and take out looseness, which facilitates winding the sheet from its rear edge.

When the rear edge portion of the sheet has been picked up in this manner, the grippers of the separating and forwarding mechanism swing forwardly and take the sheet from the suction cups, which are then disconnected from the source of vacuum.

As the grippers engage over the rear edges of the sheet, the trigger of the control for the bank advancing drive is actuated in the event the sheet is not sufficiently advanced and bank advance is required. In response to the actuation of this trigger, the bank advancing mechanism functions to advance the bank the required amount.

As the grippers take the sheet and advance it, and just prior to the end of their advancing stroke, the sheet is straightened by means of the sheet straighteners engaging against the rear edge of the sheet and pushing it forwardly in the bite of the grippers to a predetermined position. The sheet is then advanced sufficiently to have its front edge in the bite of the feed-off rolls which take the sheet from the grippers and forward it up the vertical conveyor to the top conveyor which feeds the sheet to the press.

This procedure is continued with such rapidity that the sheets leave the lower feed board of the feeder in a seriated or overlapped relation to continue their advance to the press up the vertical conveyor and over the top conveyor in such seriated overlapped relation.

Proper elevational relationship is maintained between the top of the bank on the lower feed board and the separating and forwarding mechanisms throughout the operation of the feeder by raising or lowering the mechanisms as required. When the feeler which rides on top of the bank slightly to the rear edge of the foremost sheet effects latch actuating motion in one direction, the cams 69 turn to raise the separating and forwarding mechanisms, and when this feeler effects an opposite latch actuating motion, the cams 69 turn the other way to lower the support carrying the separating and forwarding mechanism.

From the foregoing description taken in connection with the accompanying drawings, it will be readily apparent to those skilled in the art, that this invention provides a sheet feeder having numerous advantages, among which the following may be noted as outstanding: continuous operation which obviates stops to truck in loads; facile replenishing of stock because of low elevation of top feed board; stream feeding by which sheets are fed in overlapped relation at approximately one-seventh normal conveyor speed; increased capacity by virtue of the thick banks which the feeder is capable of handling; unfailing accuracy as a result of the fine care devoted to details; higher possible operating speeds; automatic maintenance of proper elevational relationship between separators and top sheet; preregistry of sheets before presentment to conveyor by squaring sheets across rear edges; elimination of much of the paper duct usually carried into press by vertical travel of sheets; press feed board clearance without entailing head room above elevation of press; and finally, good mechanical design and construction coupled with neat and trim appearance.

What I claim as my invention is:

1. In a sheet feeder, the combination of: sheet separator mechanism operable upon the topmost sheet of a source of supply, the elevation of which varies; power driven means for raising and lowering the separator mechanism; and a control for the power driven means governed by the elevation of the topmost sheet for causing said power driven means to operate in a direction necessary to maintain the separator mechanism properly positioned with relation to the topmost sheet.

2. In a sheet feeder: sheet separator mechanism; means for presenting a bank of fanned-out sheets to the separator mechanism, said bank varying in thickness; means for supporting the sheet separator mechanism independently of the bank, said means being adjustable to raise and lower the sheet separator mechanism as required to maintain the same properly positioned with relation to the height of the topmost sheet on the bank; power means for effecting such adjustment of the supporting means; and a control for said power means governed by the thickness of the bank.

3. In a sheet feeder: sheet separating and forwarding mechanism including, means for lifting an edge portion of a sheet, and means for gripping said edge portion of the sheet and forwarding the same; means for presenting a fanned-out bank of sheets to the separating and forwarding mechanism in a manner presenting the trailing edge portion of the topmost sheets to said mechanism, said bank varying in thickness; a support for said separating and forwarding mechanism movable to carry the mechanism toward and from the top of the bank to maintain the same properly positioned with relation to the topmost sheet as the thickness of the bank varies; and means controlled by the thickness of the bank for so moving said support.

4. In a sheet feeder: means for advancing a fanned-out bank of sheets along a defined path; a separator mechanism operable upon the trailing edge portion of the topmost sheet upon presentment of the sheet thereto; a support for the separator mechanism extending across the width of the bank to enable positioning the separator mechanism at any point across the width of the bank; means for raising and lowering said support; and a control for said last named means governed by the thickness of the bank adjacent to the trailing edge portion of the topmost sheet.

5. In a sheet feeder of the continuous type having upper and lower bank supporting and advancing means connected by a throat around which the bank of sheets travels from the upper to the lower one of said means: a sheet separator mechanism in the space between said two bank supporting and advancing means operable upon the trailing edge of the topmost sheet on the lower one of said means; a support for the separator mechanism independent of the bank; and means for adjusting said support in accordance with variations in the thickness of the bank on the lower one of said bank supporting and advancing means to at all times maintain the separator mechanism properly positioned with relation to the topmost sheet on the lower one of said bank supporting means.

6. In a sheet feeder of the continuous type wherein a bank of fanned out sheets loaded on one elevation is caused to reverse itself in its advance to a feed off position on another elevation: separator mechanism operable on the trailing edge portion of the topmost sheet in feed off position; an adjustable support for said separator mechanism by which the separator mechanism may be adjusted to the proper height for acting upon the sheets as they are brought to feed off position, which height varies with the thickness of the bank; and a control for said last named means governed by the thickness of the bank.

7. In a sheet feeder: means for advancing a bank of fanned out sheets to a feed off position; fixed supports extending longitudinally in the direction of sheet advance; a cross bar extending transversely across the path of the bank of sheets; means supporting the cross bar from said fixed supports in a manner enabling up and down adjustment of said cross bar; and sheet separator mechanism carried by said cross bar and positionable by adjustment of the cross bar at the proper elevation for operation on the topmost sheet of the bank.

8. In a sheet feeder: sheet separating and forwarding mechanism including, a gripper for grasping the rear edge portion of a sheet and forwarding the same with relation to a supply of sheets presented to said mechanism; means for presenting sheets to the mechanism in a fanned out bank, the elevation of the foremost sheet on the bank with relation to the separator mechanism depending upon the thickness of the bank; means for supporting the separating and forwarding mechanism independently of the bank of sheets and for adjusting the elevation thereof for proper coaction with the foremost sheet; and a control for said last named means governed by the thickness of the bank of sheets.

9. In a sheet feeder: means for supporting a stack of sheets; separating and forwarding mechanism including, a gripper movable in a fixed path above the stack of sheets and operable to grip an edge portion of a sheet lifted into the path of said gripper, and means for lifting the topmost sheet to said path, said last named means requiring a predetermined elevational relationship between the topmost sheet and the separating and forwarding mechanism; and means controlled by the height of the stack directly adjacent to said edge of the topmost sheet for adjusting the separating and forwarding mechanism to maintain the same properly positioned with relation to the topmost sheet.

10. In a sheet feeder: sheet separating and forwarding mechanism including a gripper movable in a defined path and adapted to grip the trailing edge portion of sheets as they are presented thereto; means separate from the gripper for successively lifting the trailing edges of sheets and presenting them to the gripper; and means carried by said gripper and engageable with the rear edge of the sheets to square the same.

11. In a sheet feeder: sheet separating and forwarding mechanism including at least two grippers movable in defined paths in fixed relation with each other and adapted to grip the trailing edge portion of sheets as they are presented thereto; means separate from the grippers for successively lifting the trailing edges of sheets and presenting them to the grippers; and means carried by said grippers and engageable with the rear edges of the sheets to square the same.

12. In a sheet feeder: means for gripping an edge portion of a sheet presented thereto for simultaneously imparting a forwarding motion to the sheet and squaring the same comprising, a gripper having complementary jaws to grip the sheet therebetween; and means carried by the gripper and movable toward the mouth of the jaws during the forwarding stroke of the gripper, said means having a shoulder engageable with the edge of a sheet between the jaws to push the sheet to a predetermined position in the bite of the gripper as it is advanced thereby.

13. In a sheet feeder: means for gripping an edge portion of a sheet presented thereto for simultaneously imparting a forwarding motion to the sheet and squaring the same comprising, two spaced grippers, each having complementary jaws to grip the sheet therebetween; sheet straighteners carried by the grippers and movable toward the mouth of the jaws during the forwarding stroke of the grippers, said straighteners having surfaces engageable with the edge of a sheet between the jaws to push the sheet to a predetermined position in the bite of the grippers as it is advanced thereby; and a rigid connection between the two spaced grippers and their sheet straighteners so that the two straighteners coact to preregister the sheets before they leave the grippers.

14. In a sheet feeder of the character described: a plurality of sheet grippers adapted to grip the rear edge portion of a sheet presented thereto and advance the sheet by pushing it forwardly, each of said grippers comprising, complementary jaws between which the sheet is clamped; a slide movable with relation to the jaws to engage the edge of the sheets and thereby square the same; and means for imparting a sheet squaring motion to the slide during the sheet advancing motion of the grippers.

15. In a sheet feeder: a gripper adapted to grip the rear edge portion of a sheet presented thereto and advance the same, said gripper comprising, upper and lower jaws connected for movement to and from a closed position; means mounting the jaws for movement in the direction of sheet advance; means controlling the relative positions of the jaws and operable to effect closure thereof as the gripper moves forwardly in its sheet advancing stroke; and means movable with relation to the jaws in the direction of sheet advance and at a rate of speed greater than that of the jaws for engaging the rear edge of a sheet to push the same to a predetermined position in the bite of the jaws.

16. In a sheet feeder: a gripper adapted to engage the rear edge portion of a sheet and advance the same, said gripper comprising, a lower hollow jaw having an air discharge nozzle pointed in the direction of sheet advance, an upper jaw connected with the lower jaw for movement to and from a sheet gripping position; means for moving the gripper with forward sheet advancing and retraction strokes; means for effecting closure of the gripper jaws during the sheet advancing stroke; and means connected with the hollow lower jaw for projecting a blast of air therefrom during the sheet advancing stroke.

17. In a sheet feeder wherein sheets are fed off a source of supply from the rear edge thereof: a gripper for gripping the rear edges of the sheets as they are presented thereto, said gripper comprising, complementary jaws connected for movement into and out of operative sheet gripping relation; means for moving the jaws in the direction of sheet advance; means for effecting closure of the jaws during said sheet advancing stroke; a sheet straightener having a surface extending across the plane of juncture between the jaws to engage the rear edge of a sheet gripper thereby upon forward motion of said straightener with relation to the jaws; and means for so moving the straightener during the sheet advancing stroke of the jaws.

18. In a sheet feeder of the type wherein sheets are fed in overlapped relationship by mechanism acting on the rear edge thereof: a gripper to grip the rear edge portion of the sheet and advance the same comprising, complementary jaws connected for movement to and from sheet gripping relation, said jaws having aligned openings; a sheet straightener having a portion projected into said aligned openings to dispose a surface thereof across the plane of junction between the jaws so as to be engageable with the edge of a sheet gripped thereby; means for moving the connected jaws with a sheet advancing motion; and means for moving the sheet straightener in the direction of sheet advance at a rate of speed greater than that at which the jaws travel and to a predetermined position with relation to the jaws for imparting a sheet straightening movement to the sheet.

19. In a sheet feeder, a gripper adapted to grip an edge portion of a sheet and impart motion thereto, said gripper comprising: a lower hollow jaw having a discharge opening at its front; a tubular support for the jaw through which air is blown into the hollow jaw for emission from its discharge opening; a complementary upper jaw; means connecting the jaws for movement into and out of sheet clamping relation; means connected with the support for the lower jaw for imparting a sheet advancing motion to the jaws; means for effecting closure of the jaws during said sheet advancing motion; and means for connecting the tubular support of the lower jaw with a source of air under pressure during the sheet advancing stroke of the gripper.

20. In a sheet feeder of the type wherein sheets are advanced in overlapped relationship by mechanism acting on the rear edges thereof: means successively engageable with the rear edges of the sheets and operable to advance the sheets; and means movable with said sheet advancing means and operable to wind the sheet from its rear edge during its advance.

21. In a sheet feeder of the type wherein sheets are advanced in overlapped relationship by mechanism acting on the rear edges thereof: means movable back and forth at the rear edges of the sheets for directing a blast of air under the topmost sheet to float the same forwardly; and means engageable with the rear edge portions of the sheet for controlling the floated advance of the sheets.

22. In a sheet feeder of the type wherein sheets are advanced in overlapped relationship by mechanism acting on the rear edges thereof: a sheet advancing gripper engageable with the rear edge of the sheet including a lower hollow jaw having an air discharge opening in its front for blowing air under the sheet being advanced; and means for supplying air under pressure to said hollow jaw.

23. In a sheet feeder of the type wherein sheets are advanced in overlapped relationship by mechanism acting on the rear edges thereof: a sheet advancing gripper engageable with the rear edge of the sheet including a lower hollow jaw having an air discharge opening in its front for blowing air under the sheet being advanced; a tubular support for said lower jaw connected with the interior thereof for supplying air under pressure thereto; and a valved connection between said tubular support and a source of air under pressure.

24. In a sheet feeder, a sheet gripping and straightening device comprising: a lower jaw having a flat upper surface to engage the under-surface of a sheet; a support for the lower jaw; means connected with the support for imparting a sheet advancing stroke to the gripper; a complementary upper jaw having a lower surface engageable with the top of a sheet; a hinge-like connection between the jaws; means for effecting closure of the jaws during the sheet advancing stroke of the gripper; a pusher member having a part projecting through an opening in one jaw and beyond its sheet engaging surface to engage the edge of a sheet clamped by said jaws; the other jaw having a formation to accommodate the pusher; a lever pivotally connected with the pusher member; means connecting the lever with the support for the lower jaw; and means for swinging said lever during sheet advancing motion of the gripper to carry the pusher forwardly with relation to the jaws.

25. In a sheet feeder of the type wherein sheets are fed in overlapped relation from a source of supply by mechanism acting on the rear edge thereof, the combination of: a sucker adapted to engage the rear edge portion of the topmost sheet of the supply; means for lifting the sucker directly upon sealing thereof by the topmost sheet to raise the rear edge portion of the sheet; a gripper mounted for movement in a defined path to which the sheet is lifted by the sucker, said gripper comprising, complementary jaws; and means for effecting closure of the jaws as they engage the rear edge portion of the sheet lifted by the sucker.

26. In a sheet feeder of the type wherein sheets are fed in overlapped relation from a source of supply by mechanism acting on the rear edge thereof, the combination of: a sucker adapted to engage the rear edge portion of the topmost sheet of the supply; means for lifting the sucker directly upon sealing thereof by the topmost sheet to raise the rear edge portion of the sheet; a gripper mounted for movement in a defined path to which the sheet is lifted by the sucker, said gripper comprising, complementary jaws; means for effecting closure of the jaws as they engage the rear edge portion of the sheet lifted by the sucker; and means operable on the rear edge of the sheet as it is gripped for imparting a straightening motion thereto.

27. In a sheet feeder of the type wherein sheets are fed in overlapped relation from a source of supply by mechanism acting on the rear edge thereof, the combination of: a sucker adapted to engage the rear edge portion of the topmost sheet of the supply; means for lifting the sucker directly upon sealing thereof by the topmost sheet with an upward motion to raise the rear edge portion of the sheet; a gripper mounted for movement in a defined path to which the sheet is lifted by the sucker, said gripper comprising, complementary jaws; means for effecting closure of the jaws as they engage the rear edge portion of the sheet lifted by the sucker; a sheet straightener having a part extending across the juncture of the gripper jaws to engage the edge of a sheet gripped thereby; and means for imparting motion to the sheet straightener in the direction of sheet advance at a rate of speed in excess of the sheet advancing motion of the gripper to push the sheet to a predetermined position with relation to the gripper jaws during the sheet advancing motion thereof.

28. In a sheet feeder of the type wherein sheets are advanced in overlapped relation by mechanism acting on the rear edges thereof, the combination of: a preliminary separator operable upon the rear edge portion of the topmost one of a pile of sheets to buckle the same; a sucker engageable with the buckled portion of a sheet; means for imparting an upward motion to the sucker to raise the rear edge portion of the topmost sheet; a gripper comprising, complementary upper and lower jaws, the lower jaw being hollow and having an air discharge opening in its front end for emitting a blast of air under a sheet engaged by the gripper; means for moving the gripper along a defined path to which the rear edge portion of the sheet is lifted by the sucker so that the gripper engages the same during its sheet advancing stroke; means for effecting closure of the gripper during said sheet advancing stroke; and means for supplying air under pressure to the hollow lower jaw during the sheet advancing stroke of the gripper.

29. Sheet separating and forwarding mechanism comprising: a supporting frame; a cam shaft journalled in the frame; a sheet lifting sucker supported from the frame; a sucker lifting cam on the cam shaft; a cam follower connected with the sucker riding on said cam; a sheet gripper comprising, complementary jaws; means mounted on the supporting frame carrying the gripper for forwarding movement in a path to which the sucker lifts the sheet; a gripper operating cam on the cam shaft; a cam follower connected with the gripper support and riding on said cam, and said cams being so related that the sucker lifts an edge portion of a sheet into the path of the forwarding gripper in time to be engaged by the gripper as it moves forwardly in its sheet advancing stroke.

30. In a sheet feeder of the type in which the sheets are brought to a feed off position in a fanned out bank: means for advancing the bank toward said feed off position; separating and feed off mechanism successively operable on the topmost sheets including, a gripper adapted to grip the rear edge portion of the topmost sheet; and a control for said advancing means having a feeler carried by the gripper to coact with the rear edge of the sheet.

31. In a sheet feeder of the continuous type in which sheets are advanced in a bank to a predetermined feed off position: means for lifting and gripping the rear edge portion of the topmost sheet; and a control for the bank advancing means having a feeler movable with the sheet gripping means to coact with the rear edge thereof and effect operation of the bank advancing means when the position of the topmost sheet with relation to its edgewise forward travel is insufficiently advanced.

32. In a sheet feeder: a movable support for a bank of sheets; separating and forwarding mechanism operable on the rear edge portion of the topmost sheet to lift the same off the bank and advance it with relation to the bank, said mechanism including, a gripper adapted to grip the rear edge portion of the topmost sheet and movable to advance the same; means for driving the bank support to advance the bank of sheets into position for the separating and forwarding mechanism to act upon the topmost sheet; and control means for the bank advancing means having a feeler movable with the gripper and engageable by the rear edge of the sheet gripped thereby.

33. In a sheet feeder: a support for a bank of sheets; separating and forwarding mechanism successively operable on the topmost sheets to pick the same off the bank and advance them with relation to the bank including, sheet gripping means movable to advance the sheets; a control element movable with the sheet gripping means and engageable with the rear edge portion of the sheet carried by said advancing means to be movable thereby; and means controlled by the motion imparted to said control element in the event the location of said topmost sheet is insufficiently advanced with respect to the control element for effecting advance of the bank.

34. In a sheet feeder: means for supporting and advancing a bank of sheets to successively present the topmost sheets of the bank to a feed off position; separating and forwarding mechanism operable upon the topmost sheets upon being brought to the feed off position including, a sheet gripper having complementary jaws to engage over the rear edge portion of the topmost sheet; a control element having a part engageable with the rear edge portion of the sheet in the bite of the gripper; and means governed by the control element for effecting operation of the bank advancing means.

35. In a sheet feeder of the continuous type in which sheets are advanced in a bank to a predetermined feed off position: means for advancing the bank; separating and feed off mechanism successively operable on the topmost sheets of the bank as they are brought to the feed off position said mechanism including a sheet gripping device movable through a definite range for advancing the sheet; and a control for said bank advancing means having a trigger element movable with the sheet gripping means and operable by a sheet insufficiently advanced with respect to the range of motion of the sheet gripping means for effecting advance of the bank.

36. In a sheet feeder of the continuous type in which sheets are brought to a feed off position in a fanned out bank: means for advancing the bank; a sheet gripper operable upon the topmost sheet of the bank for advancing the sheet off the bank, said gripper having a definite range of motion; and a control for the bank advancing means including, a trigger element movable with the gripper and adapted to be deflected out of a normal position to effect functioning of the bank advancing means, by a sheet insufficiently advanced with respect to the range of motion of the gripper.

37. In a sheet feeder, the combination of: a gripper having complementary jaws engageable over an edge portion of a sheet; and a trigger element carried by the gripper and extending across the mouth of the jaws to be actuated by a sheet which enters the jaws beyond a predetermined distance.

38. In a sheet feeder, the combination of: a gripper assembly having complementary jaws adapted to engage over an edge portion of a sheet; and a trigger element pivotally carried by the gripper assembly with a part extending across the mouth of the jaws to be actuated by a sheet entering the jaws beyond a predetermined distance.

39. In a sheet feeder: a gripper assembly having complementary jaws adapted to engage over an edge portion of a sheet; means mounting the gripper assembly for movement in a defined path; a trigger element movably supported from the gripper assembly and having a part extending across the mouth of the gripper jaws to be operatively actuated by a sheet entering the jaws beyond a predetermined distance; a latch mounted adjacent to the path of movement of the gripper assembly; and means on the trigger element for engaging and tripping the latch whenever said trigger element is operatively actuated by a sheet in the bite of the jaws.

40. In a sheet feeder: a gripper assembly movable in a definite path and having complementary jaws adapted to engage over an edge portion of a sheet; a latch mounted adjacent to the path of movement of the gripper assembly; and means for tripping said latch in the event the sheet engaged by the gripper jaws enters the jaws beyond a predetermined distance.

41. In a sheet feeder: a gripper assembly movable in a definite path and having complementary jaws adapted to engage over an edge portion of a sheet; a control element mounted adjacent to the path of movement of the gripper assembly; and means for actuating said control element in the event the sheet engaged by the gripper jaws enters the jaws beyond a predetermined distance.

42. In a sheet feeder: a gripper assembly movable in a definite path and having complementary jaws adapted to engage over an edge portion of a sheet; a latch mounted adjacent to the path of movement of the gripper assembly; means for tripping said latch in the event the sheet engaged by the gripper jaws enters the jaws beyond a predetermined distance, said means comprising, a trigger element pivotally carried by the gripper assembly and having a part extending across the mouth of the jaws to be engaged by a sheet entering the jaws; and means connected with the trigger element and movable upon actuation of the trigger element by a sheet, to a position engageable with the latch.

43. In a sheet feeder: a gripper assembly movable in a definite path and having complementary jaws adapted to engage over an edge portion of a sheet; a control element mounted adjacent to the path of movement of the gripper assembly; means for actuating said control element in the event the sheet engaged by the gripper jaws enters the jaws beyond a predetermined distance, said means comprising, a trigger element pivotally carried by the gripper assembly and having a part extending across the mouth of the jaws to be engaged by a sheet entering the jaws; and means connected with the trigger element and movable upon actuation of the trigger element by a sheet, to a position operable to actuate the control element.

44. In a sheet feeder of the continuous type wherein the sheets are brought to a feed off position in a fanned out bank: means for advancing the bank to successively present the topmost sheet thereof to the feed off position; sheet separating and forwarding mechanism successively operable upon the sheets as they are brought to feed off position including, a gripper having a definite range of motion, said gripper comprising, complementary jaws engageable over the rear edge portion of a sheet separated from the bank; a trigger element extending across the mouth of the jaws to be actuated by a sheet entering the jaws beyond a predetermined distance; and means responsive to motion of the trigger element produced by a sheet entering the jaws beyond a predetermined distance for effecting operation of the bank advancing means.

45. In a sheet feeder: a rigid supporting frame having a substantially horizontal portion adapted to rest on the floor, and a substantially upright portion extending up from one end of the horizontal portion; a bank supporting and advancing means mounted on the horizontal portion of the frame and adapted to advance sheets successively to a feed off position; separating and feed off mechanism carried by the horizontal portion of the frame and operable upon the rear edge portion of the foremost sheet of the bank to separate the same from the bank and advance it toward the upright portion of the frame; and conveyor means on the upright portion of the frame for advancing the sheets fed to it by the feed off mechanism in a continuous stream of overlapped sheets, said conveyor means comprising cooperating driven and idler rollers adapted to receive the sheets therebeteween and operable to carry the sheets in an overlapped stream to the top of said upright portion of the frame.

46. In a sheet feeder: a rigid supporting frame having an upright portion; cooperating driven and idler rollers mounted on said upright portion for elevating a stream of overlapped sheets therebetween; and means for presenting sheets between said cooperating rollers in seriated succession.

47. In a sheet feeder, a combination of: a rigid supporting frame having a base adapted to rest on the floor and having a substantially upright portion extending up from the base; conveyor means on said upright portion including cooperating driven and idler rollers adapted to elevate sheets in seriated succession upon presentation thereof between the rollers; means on the base of the supporting frame for presenting sheets in seriated succession to said cooperating rollers; and means supported by said upright portion for receiving the sheets from said elevating conveyor means and advancing them in seriated succession to the press or other machine being fed.

48. In a sheet feeder: means for advancing a bank of sheets to a feed off position; separator and feed off mechanism operable on the rear edge portion of the topmost sheet of the bank; means for raising and lowering said mechanism to maintain the same at the proper elevation with relation to the rear edge of the topmost sheet; a control for said means including, a feeler engaging the bank to the rear of the topmost sheet where the height of the bank is at the same elevation as it is adjacent to the rear edge of the topmost sheet as long as the bank of sheets is undiminished, and whereby the point at which the feeler engages the sheets drops below said level as the bank runs out; and means for correcting the error resulting from the feeler contact point dropping below said level so that the effect of the feeler is at all times governed from the height of the bank adjacent to the rear edge of the topmost sheet.

49. In a sheet feeder: means for supporting a fanned out bank of sheets; separating and feed off mechanism operable upon the rear edge of the topmost sheet of the bank; means for effecting adjustment of the relative positions of said mechanism and bank support to maintain the mechanism at all times properly positioned with relation to the rear edge of the topmost sheet regardless of variations in bank thickness; a control for said means having a feeler engageable with the top of the bank rearwardly of the rear edge of the topmost sheet, which point has the same elevation as the bank adjacent to the rear edge of the topmost sheet as long as the bank of sheets is undiminished but which point drops below said level; and means responsive to the decline in the elevation of the top of the bank as the bank runs out and connected between said feeder and the elements of the control with which it is connected for correcting the error resulting from the descent of the feeler during the time the bank runs out.

50. In a machine of the character described: means for supporting a fanned out bank of sheets; a feeler riding on the top of the bank of sheets a distance to the rear of the rear edge of the foremost sheet; control instrumentalities responsive to a rise and fall of the feeler with the varying thickness of the bank, said control instrumentalities being set to be governed by the height of the bank adjacent to the rear edge of the topmost sheet so that the descent of the feeler incidental to the progressive decrease in the height of the bank as the bank runs out results in an error unless corrected; and means connecting the feeler with the control instrumentalities and responsive to the progressive decrease in the height of the bank for correcting the effect of the feeler on the control instrumentalities.

51. In a machine of the character described: means for supporting a fanned out bank of sheets; a feeler riding on the top of the bank of sheets a distance to the rear of the rear edge of the foremost sheet; control instrumentalities responsive to a rise and fall of the feeler with the varying thickness of the bank, said control instrumentalities being set to be governed by the height of the bank adjacent to the rear edge of the topmost sheet so that the descent of the feeler incidental to the progressive decrease in the height of the bank as the bank runs out results in an error unless corrected; a lever having the feeler connected thereto at a point medially of its ends, one end of said lever resting on the top of the bank to the rear of the feeler so that a downward slant thereof incidental to the bank running out raises the opposite end of the lever; and means for connecting the control instrumentalities with said opposite end of the lever to thereby effect the necessary correction in the effectiveness of the feeler during the time the bank runs out.

52. In a machine of the character described: means for supporting and advancing a bank of fanned out sheets; control instrumentalities adapted to respond to variations in the thickness of the bank adjacent to the rear edge of the topmost sheet; a feeler resting on the top of the bank a distance to the rear of the rear edge of the topmost sheet at which point the bank has the same thickness as it has adjacent to the rear edge of the topmost sheet as long as the bank is undiminished, but at which the thickness of the bank decreases below its thickness adjacent to the rear edge of the topmost sheet as the bank runs out; a connection connecting the feeler with said control instrumentalities; and means responsive to the progressive decrease in bank thickness incidental to the bank running out for increasing the length of said connection between the feeler and the control instrumentalities to thereby offset the descent of the feeler incidental to the bank running out and maintain the response of the control instrumentalities to the thickness of the bank adjacent to the rear edge of the topmost sheet.

53. In a sheet feeder: means for supporting and advancing a bank of fanned out sheets; separating and feed off mechanism operable upon the rear edge portion of the topmost sheet of the bank; a support for said mechanism mounted to be raised and lowered to maintain the mechanism at the proper elevation with relation to the height of the bank adjacent to the rear edge of the topmost sheet of the bank; a cam mounted for rotation in both directions; a cam follower connected with said mechanism support whereby rotation of the cam in one direction lowers the mechanism support and rotation of the cam in the opposite direction raises the mechanism support; a two-direction ratchet wheel connected with the cam; a pair of opposed pawls mounted for simultaneous arcuate motion adjacent to the rim of said ratchet wheel; means for rocking said pawls; and means controlled from the height of the bank adjacent to the rear edge of the topmost sheet of the bank for connecting one or the other of said pawls with the teeth of the ratchet wheel.

54. In a sheet feeder: means for supporting and advancing a bank of fanned out sheets to a feed off position; separating and feed off mechanism at the feed off position operable upon the rear edge portion of the topmost sheet; a support for said mechanism mounted to be raised and lowered to maintain the mechanism properly adjusted with relation to the height of the bank adjacent to the rear edge of the topmost sheet; means for raising and lowering said support including, a cam rotatable in both directions; a cam follower riding on the cam and connected with the support whereby rotation of the cam in one direction raises the support and rotation of the cam in the opposite direction enables lowering of the support; a two-directional ratchet wheel connected with the cam; a pawl carrier; two opposed pawls mounted on said carrier; two pawl supporting arms movable with the pawl carrier for normally holding the pawls out of contact with the teeth of the ratchet wheel; and means controlled from the height of the bank adjacent to the rear edge of the topmost sheet for restraining one or the other of the pawl supporting arms against following with the pawl carrier to thereby allow its pawl to operatively engage the teeth of the ratchet wheel.

55. In a machine: a mechanism assembly to be maintained at a predetermined height with relation to work to be acted upon; a support for said mechanism enabling the same to be raised and lowered as required; a cam rotatable in opposite directions; a cam follower riding on the cam and connected with the mechanism support so that rotation of the cam in one direction raises the support, and rotation thereof in the opposite direction effects lowering of the support; a ratchet wheel connected with the cam; a pawl carrier adapted to rock about the axis of the ratchet wheel; opposed pawls on said carrier, each operable to impart rotation to the ratchet wheel in one direction; means for continuously rocking said pawl carrier and pawls thereon back and forth; two pawl supports arranged to rock about the axis of the ratchet wheel in unison with the pawl carrier and connected with the pawls to normally hold the same out of contact with the ratchet wheel; and means for restraining either pawl support against following with the cam carrier to enable its pawl to actively engage the ratchet wheel.

56. A double pawl and ratchet device comprising: a ratchet wheel; a pawl carrier mounted to rock about the axis of the ratchet wheel; means for rocking the pawl carrier back and forth; a pair of opposed pawls mounted on said carrier and engageable with the teeth of the ratchet wheel, each adapted to impart rotation to the ratchet wheel in one direction; two opposed arms having portions embracing a support concentric to the axis of the ratchet wheel; a spring yieldingly drawing said arms together at one end thereby tending to spread apart the opposite ends thereof; stops on the pawl carrier engageable with said opposite ends of the arms whereby said arms rock in unison with the pawl carrier; connections between each arm and one of said pawls for holding the pawl out of contact with the teeth of the ratchet wheel as long as the arms are in their normal positions engaging the stops on the pawl carrier; and means for restraining either of said arms against following with the pawl carrier to allow its pawl to contact the ratchet wheel.

57. In a sheet handling machine wherein sheets are advanced over a support in a fanned out bank; mechanism operable upon the rear edge portion of the topmost sheet of the bank; means supporting said mechanism for up and down motion to enable properly positioning the same with respect to the height of the rear edge of the topmost sheet; and guides for guiding the up and down motion of said mechanism, said guides being inclined from a true perpendicular to the support for the bank toward the front edge of the bank an amount substantially corresponding to the inclination of a chord joining the termini of an arc which would be formed by the rear edge of the topmost sheet upon swinging of the sheet about an axis formed by contact of its forward edge with the support for the bank from a position on said support to the position it assumes when the bank is at its maximum thickness.

58. In a sheet feeder: a supporting frame having a substantially horizontal base portion and an upright portion extending therefrom; superimposed sheet supporting platforms adapted to support sheets in a fanned out bank; a throat connecting said sheet supporting platforms and around which the bank of sheets travels in its passage from one platform to the other, said throat including a rigid supporting connection between the two platforms; transverse supporting tracks under the opposite ends of the lower platform; tracks on the undersurface of the lower platform directly above said first named tracks; anti-friction means between adjacent tracks whereby said lower platform is freely movable transversely with respect to the base; supporting rollers carried by the upright portion of the base; and a track connected with the adjacent free end of the upper platform and riding on said rollers to support said end of the upper platform for transverse motion.

59. In a sheet feeder: a supporting frame having a substantially horizontal base portion and an upright portion extending therefrom; superimposed sheet supporting platforms adapted to support sheets in a fanned out bank; a throat connecting said sheet supporting platforms and around which the bank of sheets travels in its passage from one platform to the other said throat including a rigid supporting connection between the two platforms; transverse supporting tracks under the opposite ends of the lower platform; tracks on the undersurface of the lower platform directly above said first named tracks; roller chains between adjacent tracks whereby said lower platform is freely movable transversely with respect to the base; supporting rollers carried by the upright portion of the base; a track connected with the adjacent free end of the upper platform and riding on said rollers to support said end of the upper platform for transverse motion; and manually operable means for imparting lateral motion to the connected platforms.

60. In a sheet feeder, separator mechanism including: two spaced suckers; means mounting said suckers for movement into engagement with spaced portion of a sheet including, supporting studs guided for arcuate motion in plane parallel to the side edges of the sheet, each of said studs having a sucker supporting end portion disposed angularly to the axis of the stud proper on which the sucker is mounted, whereby swinging movement of the suckers about said sucker supporting end portions of the studs causes the sheet engaging portions thereof to move apart and stretch a sheet transversely; means for actuating the sucker supporting studs through their arcuate motion to alternately engage the suckers with a sheet and lift the suckers and the sheet carried thereby; and means in the path of the suckers as they are elevated for causing them to swing on the sucker supporting end portions of the studs to effect the stretching action.

61. In a feeder for printing presses and similar machines: a conveyor for presenting separated sheets successively to the machine being fed, said conveyor including a substantially horizontal movable end section; means supporting said section for edgewise movement substantially in a horizontal plane from an operative position having its front end adjacent to the machine being fed to an inoperative retracted position affording access to the machine and vice versa; and means for so moving said section.

62. In a feeder for printing presses and similar machines: a conveyor for presenting separated sheets successively to the machine being fed, said conveyor including a substantially horizontal movable end section; means supporting said section for edgewise movement substantially in a horizontal plane from an operative position having its front end adjacent to the machine being fed to an inoperative retracted position affording access to the machine and vice versa; and for pivotal movement about a fixed axis located at the juncture of said section with the rest of the conveyor.

63. In a feeder for printing presses and other similar machines: a conveyor for carrying separated sheets successively to the machine being fed, said conveyor including a movable substantially horizontal end section; means mounting said end section for edgewise motion in a substantially horizontal plane to and from an operative position at which its front end is adjacent to the machine being fed and for pivotal motion about a fixed axis located near the rear end of said conveyor section when said section is in its operative position; and means for supporting the rear end of said conveyor section when it is moved to its inoperative position.

64. In a feeder for printing presses and other similar machines: a conveyor for carrying separated sheets successively to the machine being fed, said conveyor including a movable substantially horizontal end section; means mounting said end section for edgewise motion in a substantially horizontal plane to and from an operative position at which its front end is adjacent to the machine being fed and for pivotal motion about a fixed axis located near the rear end of said conveyor section when said section is in its operative position; and resilient means for supporting the rear end of said conveyor section when in inoperative position whereby said section may be inclined out of the plane it occupies in its operative position so as to raise the front end thereof.

65. In a feeder of the character described: a conveyor for carrying sheets successively to a machine to be fed, said conveyor comprising an upright section, and a substantially horizontal top section; means connecting said sections for bodily edgewise movement of the top section in a substantially horizontal plane and for bodily swinging movement about a fixed axis near the upper end of the upright section; and means for supporting the rear end of the top section when said section is moved back to an inoperative position.

66. In a feeder of the character described: a conveyor for carrying sheets successively to a machine to be fed, said conveyor comprising an upright section, and a substantially horizontal top section; means connecting said sections for bodily edgewise movement of the top section in a substantially horizontal plane and for bodily swinging movement about a fixed axis near the upper end of the upright section; and resilient means for supporting the rear end of said top section when said section is moved back to an inoperative position so that said top section may occupy an inclined inoperative position with its front end raised.

67. In a feeder for printing presses and the like having a feed board: a conveyor for carrying sheets successively from a source of supply across the feed board and to the machine being fed, said conveyor having a movable section disposed above the feed board when in its operative position with its front end adjacent to the machine being fed; means mounting said movable conveyor section for substantially horizontal edgewise movement across the feed board to and from its operative position and for pivotal movement about a fixed axis near the rear of the feed board; means for retracting said movable conveyor section to an inoperative position uncovering the feed board; and means for resiliently supporting the rear end of said movable conveyor section so that said section may occupy an inclined position with its front end raised off the feed board.

68. In a feeder for printing presses and similar machines having a feed board: a conveyor having an upright section leading from a source of sheet supply to the elevation of the feed board and having a substantially horizontal top section disposed over the feed board when in operative position with its front end adjacent to the machine being fed and its rear end positioned to take sheets from the upright conveyor section; means mounting said top conveyor section for bodily edgewise movement in a substantially horizontal plane to and from its operative position over the feed board and for pivotal movement about a fixed axis near the upper end of said upright conveyor section so that said top section may be moved edgewise to uncover most of the feed board and then swung about said pivot axis to raise its front end off the feed board; and means for supporting the rear end of said substantially horizontal conveyor section when in an inoperative position.

69. In a feeder of the character described: a conveyor for carrying sheets successively from a source of supply to a machine being fed, said conveyor including hingedly and slidably connected sections whereby one section is slidable to and from an operative position forming substantially a continuation of the other and is also pivotal with respect to said other section, each of said conveyor sections having sheet advancing means; and a common drive for the sheet advancing means of the two conveyor sections connected thereto adjacent to the juncture between said sections.

70. In a feeder having sheet separating and forwarding means: a conveyor for carrying sheets from said means to a machine being fed, said conveyor including a plurality of sheet forwarding rollers spaced along the length thereof; a single endless chain for driving all of said rollers; a power input for the feeder drivingly connected with said chain; and a power take-off shaft driven from the chain for carrying the drive to the separating and forwarding means.

71. In a sheet feeder of the continuous type: an upper feed board; a lower feed board, each adapted to support sheets in a fanned out bank; a throat connecting the feed boards around which sheets travel from the upper to the lower board and which in reversing the travel of the sheets inherently increases the extent to which the sheets are offset so that the thickness of the bank and the number of sheets per unit of distance is less on the lower feed board than on the upper feed board; bank advancing tapes on each feed board; and means for driving the bank advancing tapes of the upper board at a slower rate of speed than the tapes on the lower board so as to effect advance of equal numbers of sheets on each feed board per unit of time and distance.

72. In a sheet feeder of the continuous type: superimposed bank supporting and advancing means for advancing a bank of fanned out sheets; a throat forming a connection between said bank supporting and advancing means and around which the sheets travel from one to the other thereof; means for driving the first named bank supporting and advancing means at a rate of speed to advance a predetermined number of sheets a given distance within a predetermined period of time; travel of the bank around the throat increasing the extent to which the sheets are offset so that the thickness of the bank and consequently the number of sheets per unit of distance is inherently reduced during transfer of the sheets from said first named bank supporting and advancing means to the other; and means for driving said other bank supporting and advancing means at a rate of speed faster than that of the first named bank supporting and advancing means so as to enable the sheets on said other bank supporting and advancing means to be advanced said given distance in quantities equal to said predetermined number within said predetermined period of time.

73. In a sheet feeder: separating and forwarding mechanism successively operable upon the rear edge portions of sheets presented thereto, said mechanism including, a part adjacent to each side edge of the sheet, each of said parts having means at one end for gripping an individual sheet near the rear side corners thereof; means for raising said parts upon engagement of their gripping means with a sheet; and means for imparting diagonally rearward and sidewise outward motion to said end of each part during its ascent to cause the sheet to be stretched transversely, said last named means including an abutment lying in the path of upward motion of each of said parts so as to be engaged thereby during ascent of said parts.

74. In a sheet feeder: separating and forwarding mechanism operable successively upon the rear edge portions of sheets presented thereto, said mechanism including, sucker means located adjacent to the rear side corners of the sheets each having a sucker at one end for gripping the sheets; means for effecting up and down motion of the sucker means whereby the separated top sheet is gripped by the suckers; means pivotally mounting each of said sucker means for diagonally rearward and sidewise outward swinging motion of their sucker carrying ends; and means in the path of upward motion of the sucker means so as to be engaged thereby during elevation of the sucker means for causing diagonally rearward and sidewise outward swinging motion of their sucker carrying ends to effect transverse stretching of the sheets picked up by the suckers.

FRANK R. BELLUCHE.